US010589385B2

(12) United States Patent
McDowell et al.

(10) Patent No.: US 10,589,385 B2
(45) Date of Patent: Mar. 17, 2020

(54) METHOD AND SYSTEM FOR CONFINED LASER DRILLING

(71) Applicant: General Electric Company, Schenectady, NY (US)

(72) Inventors: Shamgar Elijah McDowell, Simpsonville, SC (US); Zhaoli Hu, Greer, SC (US); Abe Denis Darling, Laurens, SC (US); Douglas Anthony Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 14/592,217

(22) Filed: Jan. 8, 2015

(65) Prior Publication Data
US 2016/0199945 A1 Jul. 14, 2016

(51) Int. Cl.
B23K 26/70 (2014.01)
B23K 26/146 (2014.01)
(Continued)

(52) U.S. Cl.
CPC ............ B23K 26/705 (2015.10); B23K 26/03 (2013.01); B23K 26/032 (2013.01);
(Continued)

(58) Field of Classification Search
CPC .. B23K 26/705; B23K 26/289; B23K 26/032; B23K 26/402; B23K 2203/172;
(Continued)

(56) References Cited

U.S. PATENT DOCUMENTS 4,027,137 A 5/1977 Liedtke
4,789,770 A * 12/1988 Kasner ................... B23K 26/03
219/121.7
(Continued)

FOREIGN PATENT DOCUMENTS

DE 3643284 12/1986
EP 0515983 5/1992
(Continued)

OTHER PUBLICATIONS

European Search Report and Opinion issued in connection with corresponding EP Application No. 16150234.9 dated May 24, 2016.
(Continued)

Primary Examiner — Ibrahime A Abraham
Assistant Examiner — Chris Q Liu
(74) Attorney, Agent, or Firm — Dority & Manning, P.A.

(57) ABSTRACT

A method for drilling a hole in a component is provided. The method includes directing a confined laser beam of the confined laser drill towards a near wall of the component and sensing a characteristic of light directed along a beam axis of the confined laser beam away from the component with a sensor. The method also includes determining one or more operational conditions based on the characteristic of the light sensed with the sensor. The one or more operational conditions includes at least one of a depth of the hole being drilled by the confined laser drill and a material into which the confined laser beam of the confined laser drill is being directed. Such a method may allow for more appropriate control of the confined laser drill.

18 Claims, 16 Drawing Sheets

(51) Int. Cl.

| | | |
|---|---|---|
| *B23K 26/40* | (2014.01) | |
| *B23K 26/382* | (2014.01) | |
| *B23K 26/03* | (2006.01) | |
| *B23K 26/0622* | (2014.01) | |
| *B23K 26/402* | (2014.01) | |
| *F01D 5/18* | (2006.01) | |
| *B23K 103/16* | (2006.01) | |
| *B23K 101/00* | (2006.01) | |
| *B23K 103/18* | (2006.01) | |

(52) U.S. Cl.
CPC ........ *B23K 26/0622* (2015.10); *B23K 26/146* (2015.10); *B23K 26/382* (2015.10); *B23K 26/389* (2015.10); *B23K 26/40* (2013.01); *B23K 26/402* (2013.01); *F01D 5/18* (2013.01); *B23K 2101/001* (2018.08); *B23K 2103/172* (2018.08); *B23K 2103/26* (2018.08); *F01D 5/186* (2013.01); *F05D 2230/13* (2013.01); *F05D 2260/202* (2013.01); *Y02T 50/675* (2013.01)

(58) Field of Classification Search
CPC ............ B23K 2201/001; B23K 26/146; B23K 26/389; F01D 5/18; F01D 5/186; F05D 2230/13; F05D 2260/202; Y02T 50/675
USPC ............ 219/121.75, 121.76, 121.81, 121.83, 219/121.6, 121.67–121.69, 121.7–121.73, 219/121.85, 121.86
See application file for complete search history.

(56) References Cited

U.S. PATENT DOCUMENTS

| | | | |
|---|---|---|---|
| 4,873,414 A | 10/1989 | Ma et al. | |
| 4,905,310 A | 2/1990 | Ulrich | |
| 4,931,615 A | 6/1990 | Muncy et al. | |
| 4,940,880 A | 7/1990 | Klingel et al. | |
| 4,952,771 A | 8/1990 | Wrobel | |
| 5,026,979 A | 6/1991 | Ortiz, Jr. et al. | |
| 5,045,669 A * | 9/1991 | Ortiz, Jr. | B23K 26/032 219/121.61 |
| 5,182,434 A | 1/1993 | Nakata | |
| 5,222,617 A | 6/1993 | Gregory et al. | |
| 5,286,947 A * | 2/1994 | Clyde | B23K 31/006 219/121.68 |
| 5,374,803 A | 2/1994 | Yamada | |
| 5,367,144 A | 11/1994 | Matsumura et al. | |
| 5,773,791 A | 6/1998 | Kuykendal | |
| 5,902,499 A | 5/1999 | Richerzhagen | |
| 6,001,219 A | 12/1999 | Caspar | |
| 6,140,604 A | 10/2000 | Somers et al. | |
| 6,172,331 B1 * | 1/2001 | Chen | B23K 26/032 219/121.7 |
| 6,696,666 B2 | 2/2004 | Merdan et al. | |
| 7,163,875 B2 | 1/2007 | Richerzhagen et al. | |
| 7,728,258 B2 | 6/2010 | Richerzhagen et al. | |
| 8,525,073 B2 * | 9/2013 | Quitter | B23K 26/03 219/121.67 |
| 8,581,141 B2 | 11/2013 | Muratsubaki et al. | |
| 2004/0004061 A1 * | 1/2004 | Merdan | A61F 2/91 219/121.7 |
| 2004/0224179 A1 | 11/2004 | Sokol et al. | |
| 2005/0115940 A1 * | 6/2005 | Matsushita | B23K 26/705 219/121.83 |
| 2005/0226287 A1 * | 10/2005 | Shah | G01J 11/00 372/25 |
| 2006/0096964 A1 | 5/2006 | Fordahl | |
| 2007/0106416 A1 * | 5/2007 | Griffiths | B23K 26/032 700/166 |
| 2007/0193990 A1 | 8/2007 | Richerzhagen et al. | |
| 2007/0278195 A1 | 12/2007 | Richerzhagen et al. | |
| 2009/0001061 A1 | 1/2009 | Beck | |
| 2009/0314753 A1 | 12/2009 | Kosmowski | |
| 2010/0147812 A1 | 6/2010 | Beck et al. | |
| 2010/0147814 A1 | 6/2010 | Watanabe | |
| 2011/0017715 A1 | 1/2011 | Marcus et al. | |
| 2011/0049113 A1 | 3/2011 | Glaesemann et al. | |
| 2011/0076405 A1 | 3/2011 | Raji et al. | |
| 2011/0180521 A1 * | 7/2011 | Quitter | B23K 26/03 219/121.73 |
| 2011/0240615 A1 | 10/2011 | Suruceanu et al. | |
| 2012/0074105 A1 | 3/2012 | Okamoto et al. | |
| 2013/0020292 A1 | 1/2013 | Elfizy et al. | |
| 2013/0048617 A1 | 2/2013 | Morikazu | |
| 2013/0146570 A1 * | 6/2013 | Forsman | B23K 26/18 219/121.71 |
| 2013/0206739 A1 | 8/2013 | Reed et al. | |
| 2014/0075755 A1 | 3/2014 | Hut et al. | |
| 2014/0076857 A1 | 3/2014 | Hu et al. | |
| 2014/0076868 A1 | 3/2014 | Hu et al. | |

FOREIGN PATENT DOCUMENTS

| | | |
|---|---|---|
| EP | 0937533 | 8/1999 |
| EP | 1833636 | 7/2010 |
| GB | 2113592 | 8/1983 |
| JP | 58125389 A | 7/1983 |
| WO | WO 95/32834 | 12/1995 |

OTHER PUBLICATIONS

U.S. Appl. No. 14/164,506, filed Sep. 14, 2012.
U.S. Appl. No. 14/164,522, filed Jan. 27, 2014.
U.S. Appl. No. 14/164,539, filed Jan. 27, 2014.
U.S. Appl. No. 14/164,506, filed Jan. 27, 2014.
Sensors-2012, ISSN 1424-8220; On Line Estimation of Laser-Drilled Hole Depth Using A Machine Vision Method, Chao-Ching Ho, et al. Published Jul. 27, 2012, pp. 10148-10162.

* cited by examiner

METHOD AND SYSTEM FOR CONFINED LASER DRILLING

FIELD OF THE INVENTION

The present disclosure relates to a method and system for drilling one or more holes in a component a confined laser drill.

BACKGROUND OF THE INVENTION

Turbines are widely used in industrial and commercial operations. A typical commercial steam or gas turbine used to generate electrical power includes alternating stages of stationary and rotating airfoils. For example, stationary vanes may be attached to a stationary component such as a casing that surrounds the turbine, and rotating blades may be attached to a rotor located along an axial centerline of the turbine. A compressed working fluid, such as but not limited to steam, combustion gases, or air, flows through the turbine, and the stationary vanes accelerate and direct the compressed working fluid onto the subsequent stage of rotating blades to impart motion to the rotating blades, thus turning the rotor and performing work.

An efficiency of the turbine generally increases with increased temperatures of the compressed working fluid. However, excessive temperatures within the turbine can reduce the longevity of the airfoils in the turbine and thus increase repairs, maintenance, and outages associated with the turbine. As a result, various designs and methods have been developed to provide cooling to the airfoils. For example, a cooling media can be supplied to a cavity inside the airfoil to convectively and/or conductively remove heat from the airfoil. In particular embodiments, the cooling media flows out of the cavity through cooling passages in the airfoil to provide film cooling over the outer surface of the airfoil.

As temperatures and/or performance standards continue to increase, the materials used for the airfoil become increasingly thin, making reliable manufacture of the airfoil increasingly difficult. For example, certain airfoils are cast from a high alloy metal, and a thermal barrier coating is applied to the outer surface of the airfoil to enhance thermal protection. A water jet can be used to create cooling passages through the thermal barrier coating and outer surface, but the water jet causes portions of the thermal barrier coating to chip off. Alternately, the thermal barrier coating can be applied to the outer surface of the airfoil after the cooling passages have been created by an electron discharge machine (EDM), but this requires additional processing to remove any thermal barrier coating covering the newly formed cooling passages. Moreover, this process of re-opening the cooling holes after the coating process becomes increasingly difficult and requires more labor hours and skill when the sizes of the cooling holes decrease and the number of cooling holes increase.

A laser drill utilizing a focused laser beam can be used to create the cooling passages through the airfoil with a reduced risk of chipping the thermal barrier coating. The laser drill, however, requires precise control due to the presence of the cavity within the airfoil. Once the laser drill breaks through a near wall of the airfoil, continued operation of the laser drill by conventional methods can result in damage to an opposite side of the cavity, potentially resulting in a damaged airfoil that must be refurbished or discarded.

Accordingly, a method and system for determining a breakthrough of a laser drill when drilling a hole in a component of a gas turbine would be beneficial. More particularly, a method and system for determining a breakthrough of a laser drill when drilling a hole in a component of a gas turbine based on one or more operating conditions determined during such a drilling process would be particularly useful.

BRIEF DESCRIPTION OF THE INVENTION

Aspects and advantages of the invention are set forth below in the following description, or may be obvious from the description, or may be learned through practice of the invention.

In one exemplary aspect of the present disclosure, a method for drilling a hole in a near wall of a component is provided. The method includes directing a confined laser beam of a confined laser drill towards the near wall of the component to drill the hole in the near wall of the component. The confined laser beam defines a beam axis and the near wall is positioned adjacent to a cavity defined in the component. The method also includes sensing a characteristic of light directed along the beam axis away from the component with a sensor. The method also includes determining one or more operational conditions based on the characteristic of light sensed with the sensor. The one or more operational conditions includes at least one of a depth of the hole being drilled by the confined laser drill and a material into which the confined laser beam of the confined laser drill is being directed.

In one exemplary embodiment of the present disclosure, a system is provided for drilling a hole in a near wall of a component. The system includes a confined laser drill utilizing a confined laser beam defining a beam axis. The confined laser drill is configured to drill the hole through the near wall of the component, and the near wall is positioned adjacent to a cavity defined by the component. The system also includes a sensor positioned to sense a characteristic of light directed along the beam axis away from the near wall of the component. The system also includes a controller operably connected to the sensor. The controller is configured to determine one or more operational conditions based on the characteristic of light sensed with the sensor. The one or more operational conditions includes at least one of a depth of the hole being drilled and a material into which the confined laser beam of the laser drill is being directed.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

DETAILED DESCRIPTION OF THE INVENTION

Figure 1:
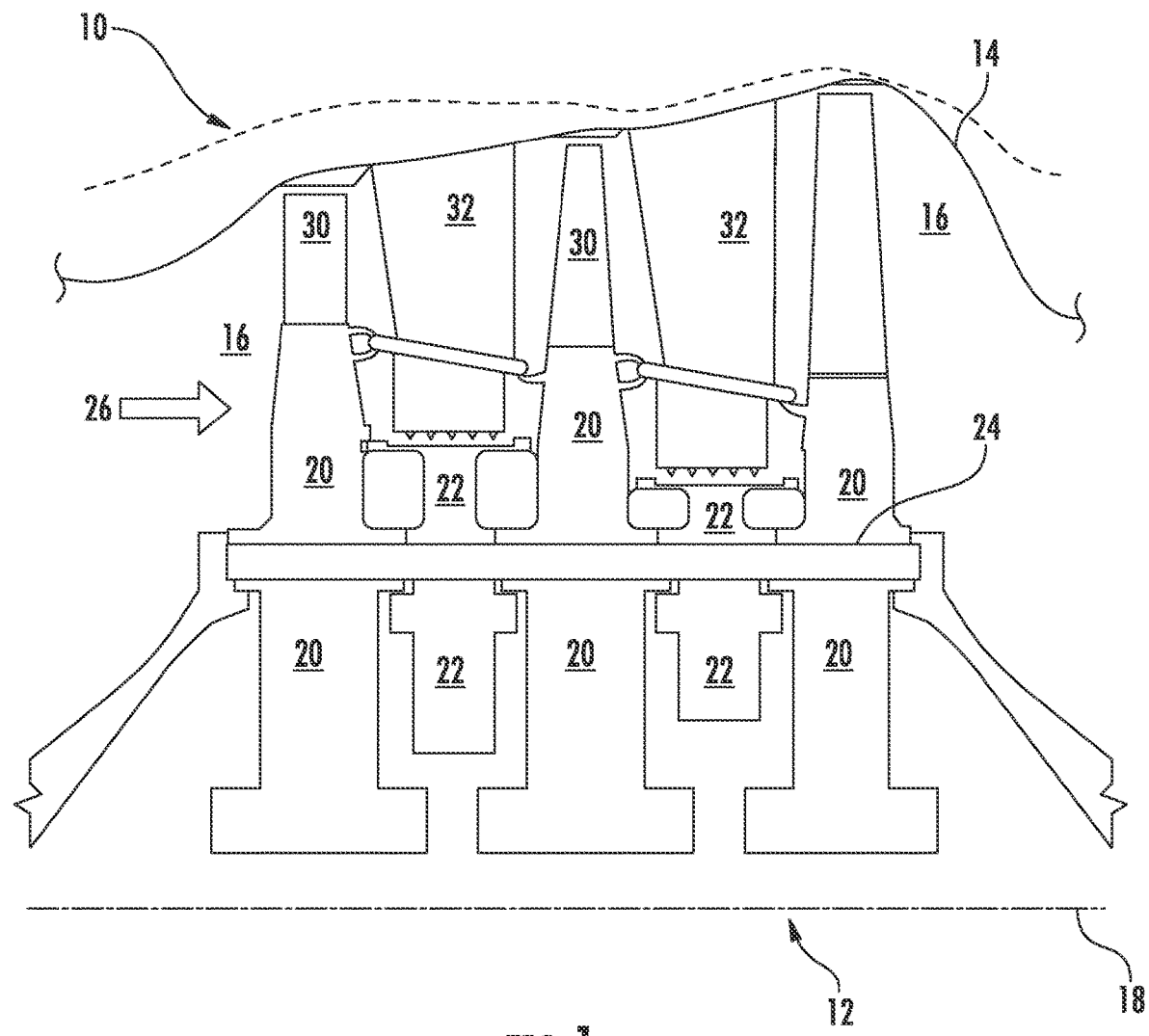
FIG. 1 is a simplified cross-sectional view of a turbine section of an exemplary gas turbine that may incorporate various embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents. Although exemplary embodiments of the present disclosure will be described generally in the context of manufacturing an airfoil 38 for a turbomachine for purposes of illustration, one of ordinary skill in the art will readily appreciate that embodiments of the present disclosure may be applied to other articles of manufacture and are not limited to a system or method for manufacturing an airfoil 38 for a turbomachine unless specifically recited in the claims. For example, in other exemplary embodiments, aspects of the present disclosure may be used to manufacture an airfoil 38 for use in the aviation context or to manufacture other components of a gas turbine.

As used herein, the terms "first", "second", and "third" may be used interchangeably to distinguish one component from another and are not intended to signify location or importance of the individual components. Similarly, the terms "near" and "far" may be used to denote relative position of an article or component and are not intended to signify any function or design of said article or component.

Referring now to the drawings, FIG. 1 provides a simplified side cross-section view of an exemplary turbine section 10 of a gas turbine according to various embodiments of the present disclosure. As shown in FIG. 1, the turbine section 10 generally includes a rotor 12 and a casing 14 that at least partially define a gas path 16 through the turbine section 10. The rotor 12 is generally aligned with an axial centerline 18 of the turbine section 10 and may be connected to a generator, a compressor, or another machine to produce work. The rotor 12 may include alternating sections of rotor wheels 20 and rotor spacers 22 connected together by a bolt 24 to rotate in unison. The casing 14 circumferentially surrounds at least a portion of the rotor 12 to contain a compressed working fluid 26 flowing through the gas path 16. The compressed working fluid 26 may include, for example, combustion gases, compressed air, saturated steam, unsaturated steam, or a combination thereof.

As shown in FIG. 1, the turbine section 10 further includes alternating stages of rotating blades 30 and stationary vanes 32 that extend radially between the rotor 12 and the casing 14. The rotating blades 30 are circumferentially arranged around the rotor 12 and may be connected to the rotor wheels 20 using various means. In contrast, the stationary vanes 32 may be peripherally arranged around the inside of the casing 14 opposite from the rotor spacers 22. The rotating blades 30 and stationary vanes 32 generally have an airfoil 38 shape, with a concave pressure side, a convex suction side, and leading and trailing edges, as is known in the art. The compressed working fluid 26 flows along the gas path 16 through the turbine section 10 from left to right as shown in FIG. 1. As the compressed working fluid 26 passes over the first stage of rotating blades 30, the compressed working fluid expands, causing the rotating blades 30, rotor wheels 20, rotor spacers 22, bolt 24, and rotor 12 to rotate. The compressed working fluid 26 then flows across the next stage of stationary vanes 32 which accelerate and redirect the compressed working fluid 26 to the next stage of rotating blades 30, and the process repeats for the following stages. In the exemplary embodiment shown in FIG. 1, the turbine section 10 has two stages of stationary vanes 32 between three stages of rotating blades 30; however, one of ordinary skill in the art will readily appreciate that the number of stages of rotating blades 30 and stationary vanes 32 is not a limitation of the present disclosure unless specifically recited in the claims.

Figure 2:
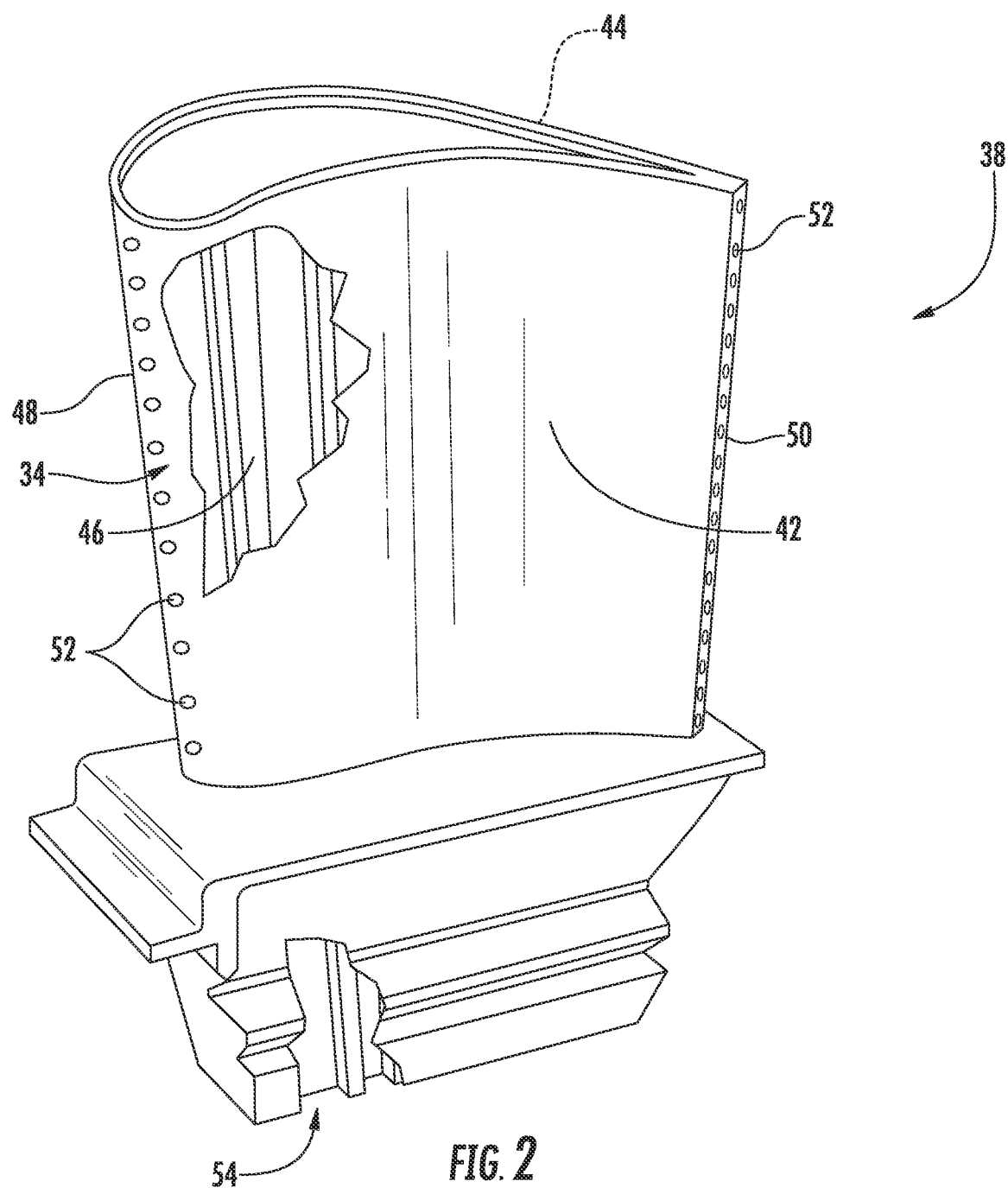
FIG. 2 is a perspective view of an exemplary airfoil according to an embodiment of the present disclosure.

FIG. 2 provides a perspective view of an exemplary airfoil 38, such as may be incorporated into the rotating blades 30 or stationary vanes 32, according to an embodiment of the present disclosure. As shown in FIG. 2, the airfoil 38 generally includes a pressure side 42 having a concave curvature and a suction side 44 opposed to the pressure side 42 having a convex curvature. The pressure and suction sides 42, 44 are separated from one another to define a cavity 46 inside the airfoil 38 between the pressure and suction sides 42, 44. The cavity 46 may provide a serpentine or tortuous path for a cooling media to flow inside the airfoil 38 to conductively and/or convectively remove heat from the airfoil 38. In addition, the pressure and suction sides 42, 44 further join to form a leading edge 48 at an upstream portion of the airfoil 38 and a trailing edge 50 downstream from the cavity 46 at a downstream portion of the airfoil 38. A plurality of cooling passages 52 in the pressure side 42, suction side 44, leading edge 48, and/or trailing edge 50 may provide fluid communication with the cavity 46 through the airfoil 38 to supply the cooling media over an outer surface 34 of the airfoil 38. As shown in FIG. 2, for example, the cooling passages 52 may be located at the leading and trailing edges 48, 50 and/or along either or both of the pressure and suction sides 42, 44. The exemplary airfoil 38 further defines an opening 54 at a base and of the airfoil 38 wherein cooling media, such as compressed air from a compressor section of the gas turbine, may be provided to the cavity 46.

One of ordinary skill in the art will readily appreciate from the teachings herein that the number and/or location of the cooling passages 52 may vary according to particular embodiments, as may the design of the cavity 46 and the design of the cooling passages 52. Accordingly, the present disclosure is not limited to any particular number or location of cooling passages 52 or cavity 46 design unless specifically recited in the claims.

In certain exemplary embodiments, a thermal barrier coating 36 may be applied over at least a portion of an outer surface 34 of a metal portion 40 of the airfoil 38 (see FIG. 3), covering the underlying metal portion 40 of the airfoil 38. The thermal barrier coating 36, if applied, may include low emissivity or high reflectance for heat, a smooth finish, and/or good adhesion to the underlying outer surface 34.

Co-Axial Sensing

Figure 3:
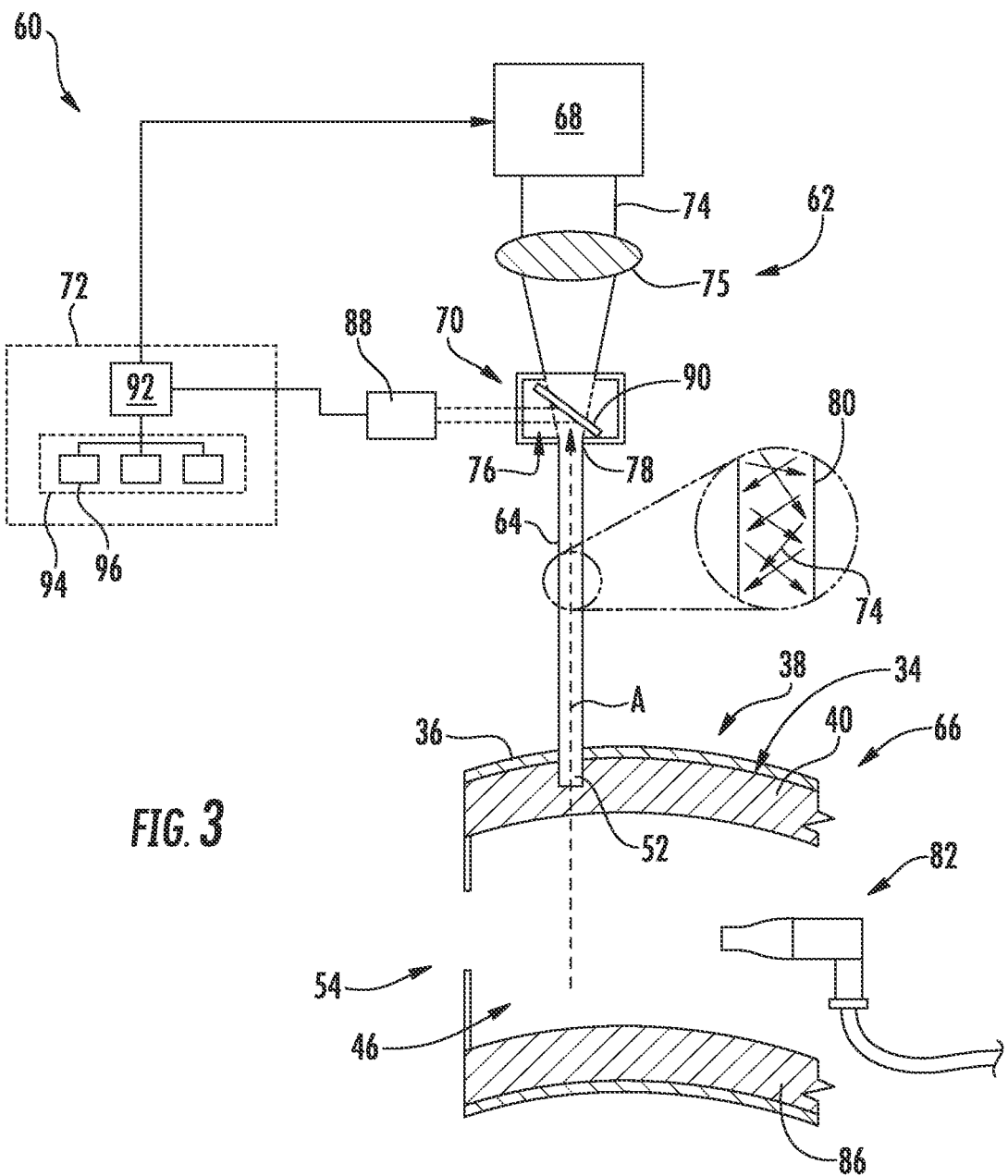
FIG. 3 is a schematic view of a system for manufacturing an airfoil according to one embodiment of the present disclosure.
Figure 4:
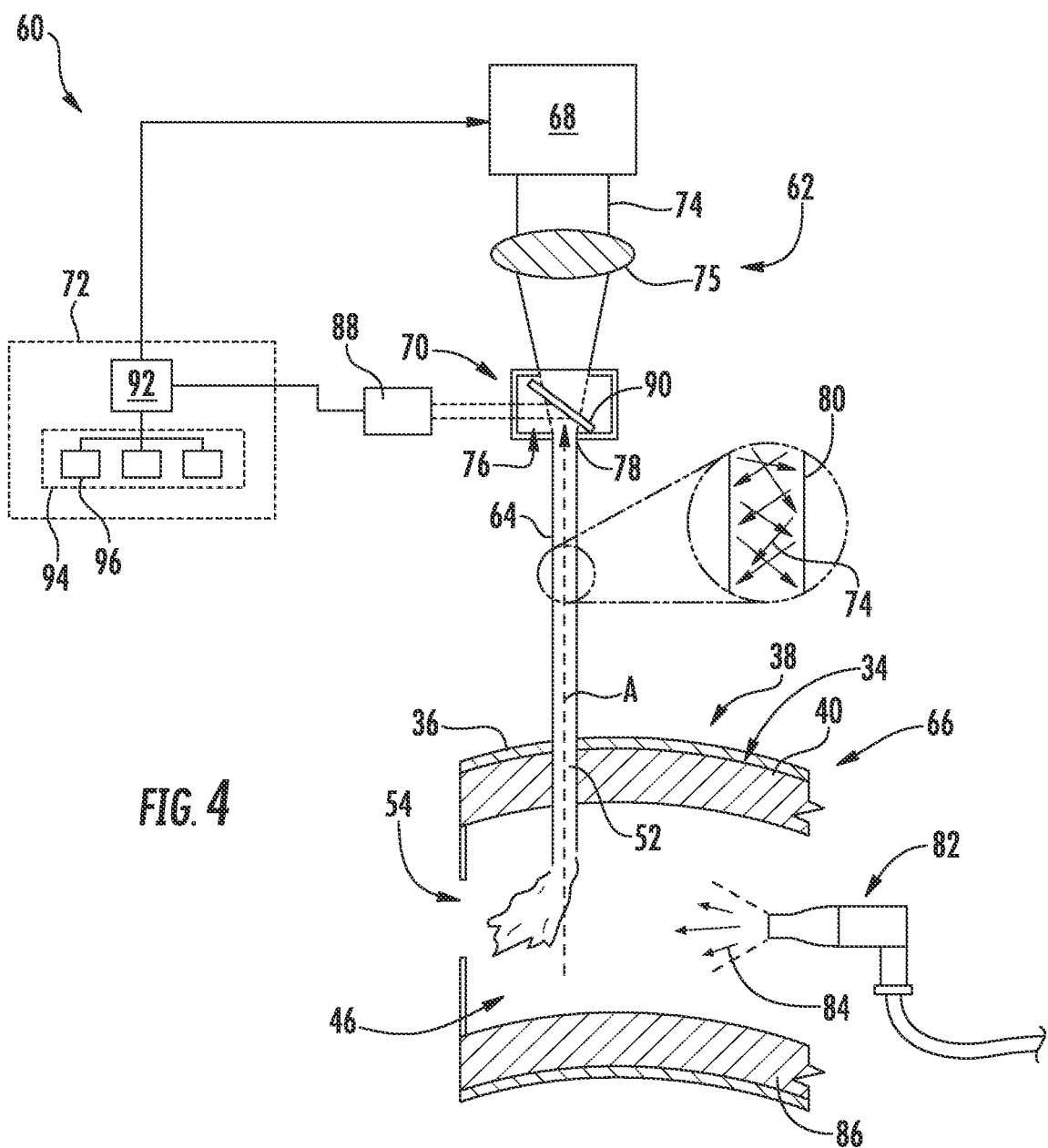
FIG. 4 is a schematic view of the exemplary system of FIG. 3 after a confined laser beam has broken through a near wall of the airfoil.

Referring now to FIGS. 3 and 4, a perspective view of an exemplary system 60 of the present disclosure is provided. The system 60 may be used in, for example, the manufacturing of a component for a gas turbine. More particularly, for the embodiment depicted, the system 60 is used for manufacturing/drilling one or more holes or cooling passages 52 in an airfoil 38 of a gas turbine, such as the airfoil 38 discussed above with reference to FIG. 2. It should be appreciated, however, that although the system 60 is described herein in the context of manufacturing the airfoil 38, in other exemplary embodiments, the system 60 may be used in manufacturing any other suitable component for a gas turbine. For example, the system 60 may be used in manufacturing transition pieces, nozzles, combustion liners, effusion or impingement plates, vanes, shrouds, or any other suitable part.

Exemplary system 60 generally includes a confined laser drill 62 configured to direct a confined laser beam 64 towards a near wall 66 of the airfoil 38 to drill a hole 52 in the near wall 66 of the airfoil 38. The confined laser beam 64 defines a beam axis A and the near wall 66 is positioned adjacent to the cavity 46. More particularly, various embodiments of the confined laser drill 62 may generally include a laser mechanism 68, a collimator 70, and a controller 72.

The laser mechanism 68 may include any device capable of generating a laser beam 74. By way of example only, in certain exemplary embodiments, laser mechanism 68 may be a diode pumped Nd:YAG laser capable of producing a laser beam at a pulse frequency of approximately 10-50 kHz, a wavelength of approximately one micrometer, or if utilizing second harmonic generation ("SHG") between 500-550 nanometers, and an average power of approximately 10-200 W. However, in other embodiments, any other suitable laser mechanism 68 may be utilized.

In the particular embodiment shown in FIGS. 3 and 4, the laser mechanism 68 directs laser beam 74 through a focusing lens 75 to collimator 70. The collimator 70 reshapes a diameter of the beam 74 to achieve a better focus feature when the beam 74 is being focused into a different media, such as a glass fiber or water. Accordingly, as used herein, the collimator 70 includes any device that narrows and/or aligns a beam of particles or waves to cause the spatial cross section of the beam to become smaller. For example, as shown in FIGS. 3 and 4, collimator 70 may include a chamber 76 that receives the laser beam 74 along with a fluid, such as deionized or filtered water. An aperture or nozzle 78, which may have a diameter of between approximately twenty and one hundred and fifty microns, directs the laser beam 74 inside a liquid column 80 toward the airfoil 38—forming confined laser beam 64. Liquid column 80 may have a pressure of approximately 2,000 to 3,000 pounds per square inch. However, the present disclosure is not limited to any particular pressure for the liquid column 80 or diameter for nozzle 78 unless specifically recited in the claims. Additionally, it should be appreciated, that as used herein, terms of approximation, such as "about" or "approximately," refer to being within a ten percent margin of error.

As shown in the enlarged view in FIGS. 3 and 4, liquid column 80 may be surrounded by air, such as a protection gas, and act as a light guide and focusing mechanism for laser beam 74. Accordingly, liquid column 80 and laser beam 74, guided by liquid column 80 as discussed above, may together form the confined laser beam 64 utilized by the confined laser drill 62 and directed at the airfoil 38.

As stated, the confined laser beam 64 may be utilized by confined laser drill 62 to, e.g., drill one or more cooling passages 52 through airfoil 38. More particularly, confined laser beam 64 may ablate outer surface 34 of the airfoil 38, eventually creating the desired cooling passage 52 through the airfoil 38. Notably, FIG. 3 depicts the system 60 prior to confined laser beam 64 "breaking through" near wall 66 of airfoil 38, while FIG. 4 depicts system 60 subsequent to confined laser beam 64 having broken through near wall 66 of the airfoil 38. As used herein, the term "breakthrough," "breaking through," and cognates thereof refer to when confined laser beam 64 has removed a continuous portion of the material forming near wall 66 of airfoil 38 along beam axis A of confined laser beam 64. Subsequent to any breakthrough of confined laser beam 64 through near wall 66 of airfoil 38, at least a portion of said confined laser beam 64 may pass therethrough into, for example, the cavity 46 of the airfoil 38.

With continued reference to FIGS. 3 and 4, the system 60 further includes an exemplary backstrike protection mechanism 82. Exemplary backstrike protection mechanism 82 depicted includes a gas 84 flowing inside the airfoil 38. As used herein, the term "gas" may include any gaseous media. For example, the gas 84 may be an inert gas, a vacuum, a saturated steam, a superheated steam, or any other suitable gas that may form a gaseous flow inside cavity 46 of the airfoil 38. Gas 84 flowing inside airfoil 38 may have a pressure roughly commensurate with the pressure of the liquid of liquid column 80, or any other pressure sufficient to disrupt confined laser beam 64. More particularly, gas 84 may have any other pressure sufficient to generate a sufficient kinetic moment or speed to disrupt liquid column 80 within the cavity 46 of the airfoil 38. For example, in certain exemplary embodiments, gas 84 flowing inside the airfoil 38 may have a pressure greater than approximately twenty-five pounds per square inch, although the present disclosure is not limited to any particular pressure for the gas 84 unless specifically recited in the claims.

As shown most clearly in FIG. 4, gas 84 may be aligned to intersect with confined laser beam 64 inside the cavity 46 of airfoil 38. In particular embodiments, the gas 84 may be aligned substantially perpendicular to liquid column 80, while in other particular embodiments, the gas 84 may be aligned at an oblique or acute angle with respect to the liquid column 80 and/or confined laser beam 64. As gas 84 intersects with the liquid column 80 inside airfoil 38, gas 84 disrupts the liquid column 80 and scatters laser beam 74 of confined laser beam 64 inside the cavity 46 of the airfoil 38. In this manner, gas 84 prevents confined laser beam 64 from striking an inside surface of the cavity 46 of the airfoil 38 opposite from the newly formed cooling passage 52 in the near wall 66. More particularly, gas 84 prevents confined laser beam 64 from striking a far wall 86 of the airfoil 38.

The exemplary system 60 of FIGS. 3 and 4 additionally includes a sensor 88 operably connected with the controller 72, further discussed below. For the embodiment depicted, sensor 88 is configured to sense a characteristic of light and send a signal 68 to the controller 72 indicative of the sensed characteristic of light. More particularly, the sensor 88 is positioned to sense a characteristic of light directed along the beam axis A away from the near wall 66 of the airfoil 38, e.g., reflected and/or redirected light from the cooling passage 52. In certain exemplary embodiments, the sensor 88 may be an oscilloscope sensor suitable for sensing one or more of the following characteristics of light: an intensity of light, one or more wavelengths of light, an amount of light, a shape of a light pulse in time, and a shape of a light pulse in frequency. Additionally, for the embodiment depicted, sensor 88 is offset from the beam axis A and is configured to sense a characteristic of reflected light along the beam axis A by redirecting at least a portion of the reflected light directed along the beam axis A to the sensor 88 with a redirection lens 90. Redirection lens 90 is positioned in the beam axis A, i.e., intersecting the beam axis A, at approximately a forty-five degree angle with the beam axis A. However, in other exemplary embodiments, redirection lens 90 may define any other suitable angle with respect to the beam axis A. Additionally, although for the embodiment of FIGS. 3 and 4, redirection lens 90 is positioned in collimator 70, in other embodiments, lens 90 may instead be positioned between collimator 70 and focusing lens 75, or alternatively between focusing lens 75 and laser mechanism 68. Redirection lens 90 may include a coating on a first side (i.e., the side closest to near wall 66 of airfoil 38) which redirects at least a portion of the reflected light traveling along the beam axis A to the sensor 88. The coating may be what is referred to as a "one-way" coating such that substantially no light traveling along the beam axis towards the near wall 66 of the airfoil 38 is redirected by the lens or its coating. For example, in certain embodiments, the coating may be an electron beam coating ("EBC") coating.

Referring still to the exemplary system 60 of FIGS. 3 and 4, controller 72 may be any suitable processor-based computing device, and may be in operable communication with, e.g., confined laser drill 62, sensor 88, and backstrike protection mechanism 82. For example, suitable controllers 72 may include one or more personal computers, mobile phones (including smart phones), personal digital assistants, tablets, laptops, desktops, workstations, game consoles, servers, other computers and/or any other suitable computing devices. As shown in FIGS. 3 and 4, the controller 72 may include one or more processors 92 and associated memory 94. The processor(s) 92 may generally be any suitable processing device(s) known in the art. Similarly, the memory 94 may generally be any suitable computer-readable medium or media, including, but not limited to, RAM, ROM, hard drives, flash drives, or other memory devices. As is generally understood, the memory 94 may be configured to store information accessible by the processor(s) 92, including instructions or logic 96 that can be executed by the processor(s) 92. The instructions or logic 96 may be any set of instructions that when executed by the processor(s) 92 cause the processor(s) 92 to provide a desired functionality. For instance, the instructions or logic 96 can be software instructions rendered in a computer-readable form. When software is used, any suitable programming, scripting, or other type of language or combinations of languages may be used to implement the teachings contained herein. In particular embodiments of the present disclosure, for example, the instructions or logic 96 may be configured to implement one or more of the methods described below with reference to FIG. 5, 11, 16, or 18. Alternatively, the instructions can be implemented by hard-wired logic 96 or other circuitry, including, but not limited to application-specific circuits. Moreover, although controller 72 is depicted schematically separate from sensor 88, in other exemplary embodiments, sensor 88 and controller 72 may be integrated into a single device positioned at any suitable location.

Figure 5:
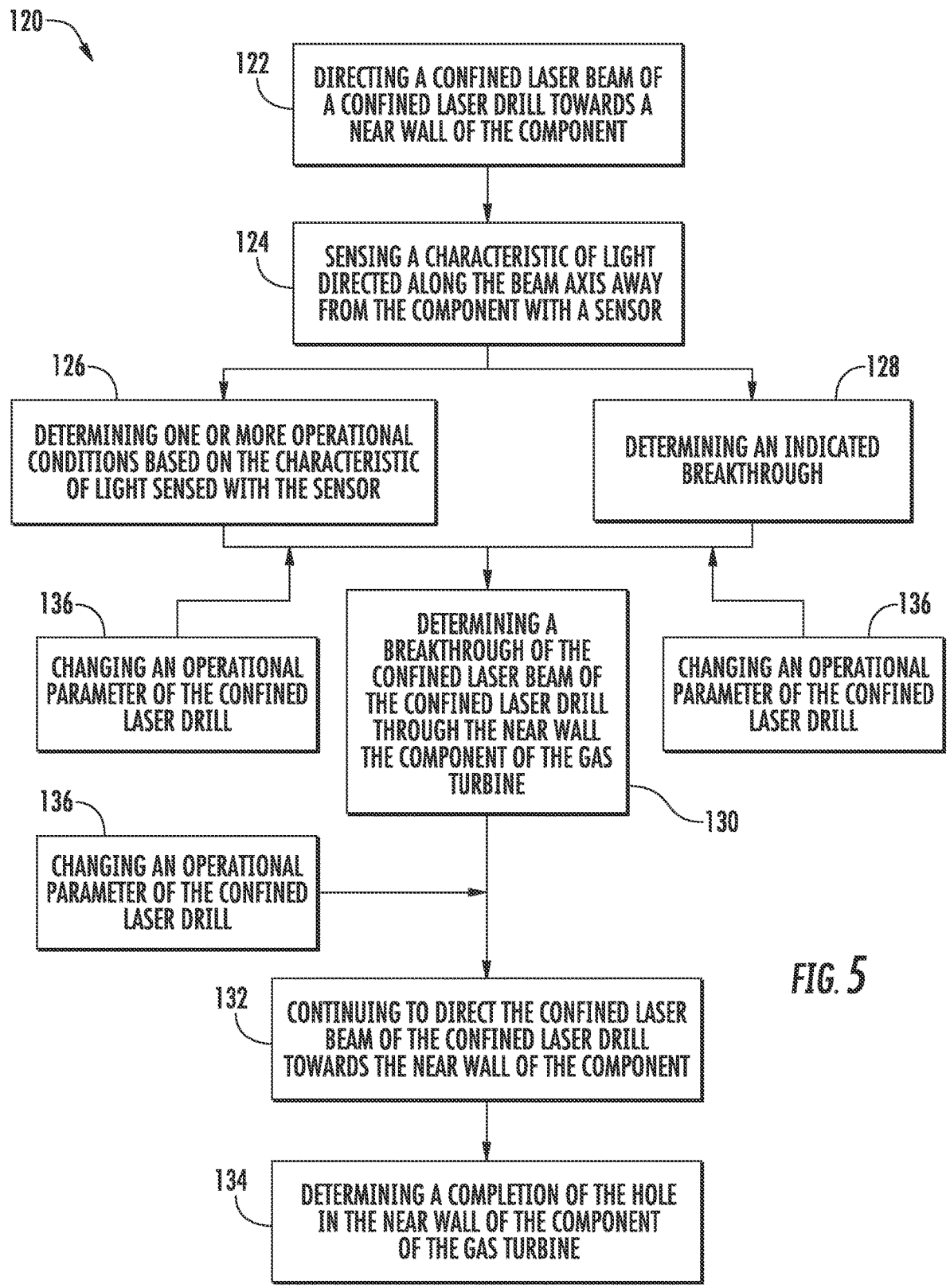
FIG. 5 is a flow diagram of a method for manufacturing an airfoil in accordance with an exemplary aspect of the present disclosure.

Referring now to FIG. 5, a flow diagram of an exemplary method (120) of manufacturing an airfoil of a gas turbine is provided. More particularly, the flow diagram of FIG. 5 illustrates an exemplary method (120) for drilling a hole in an airfoil of a gas turbine. The exemplary method (120) of FIG. 5 may be utilized with the exemplary system depicted in FIGS. 3 and 4 and described above. Accordingly, although discussed in the context of drilling a hole in an airfoil, the exemplary method (120) may alternatively be used to drill a hole in any other suitable component of a gas turbine.

The method (120) generally includes at (122) directing a confined laser beam of a confined laser drill towards a near wall of the airfoil to drill the hole in the near wall of the airfoil. The confined laser beam defines a beam axis and the near wall is positioned adjacent to a cavity defined in the airfoil. The method (120) additionally includes at (124) sensing a characteristic of light directed along the beam axis away from the airfoil with a sensor. The light directed along the beam axis away from the airfoil may, in certain aspects, refer to the light reflected from the near wall of the airfoil. In certain exemplary aspects, sensing a characteristic of light at (124) may include sensing at least one of an intensity of light, one or more wavelengths of light, a shape of a light pulse in time, and a shape of a light pulse in frequency. Additionally, the sensor may be offset from the beam axis, such that sensing a characteristic of light at (124) may further include redirecting at least a portion of the light directed along the beam axis away from the airfoil to the sensor with a lens.

Referring still to FIG. 5, the exemplary method (120) further includes at (126) determining one or more operational conditions based on the characteristic of light sensed with the sensor at (124). The one or more operational conditions include at least one of a depth of the hole being drilled by the confined laser drill and a material into which the confined laser beam of the confined laser drill is being directed.

Figure 6:
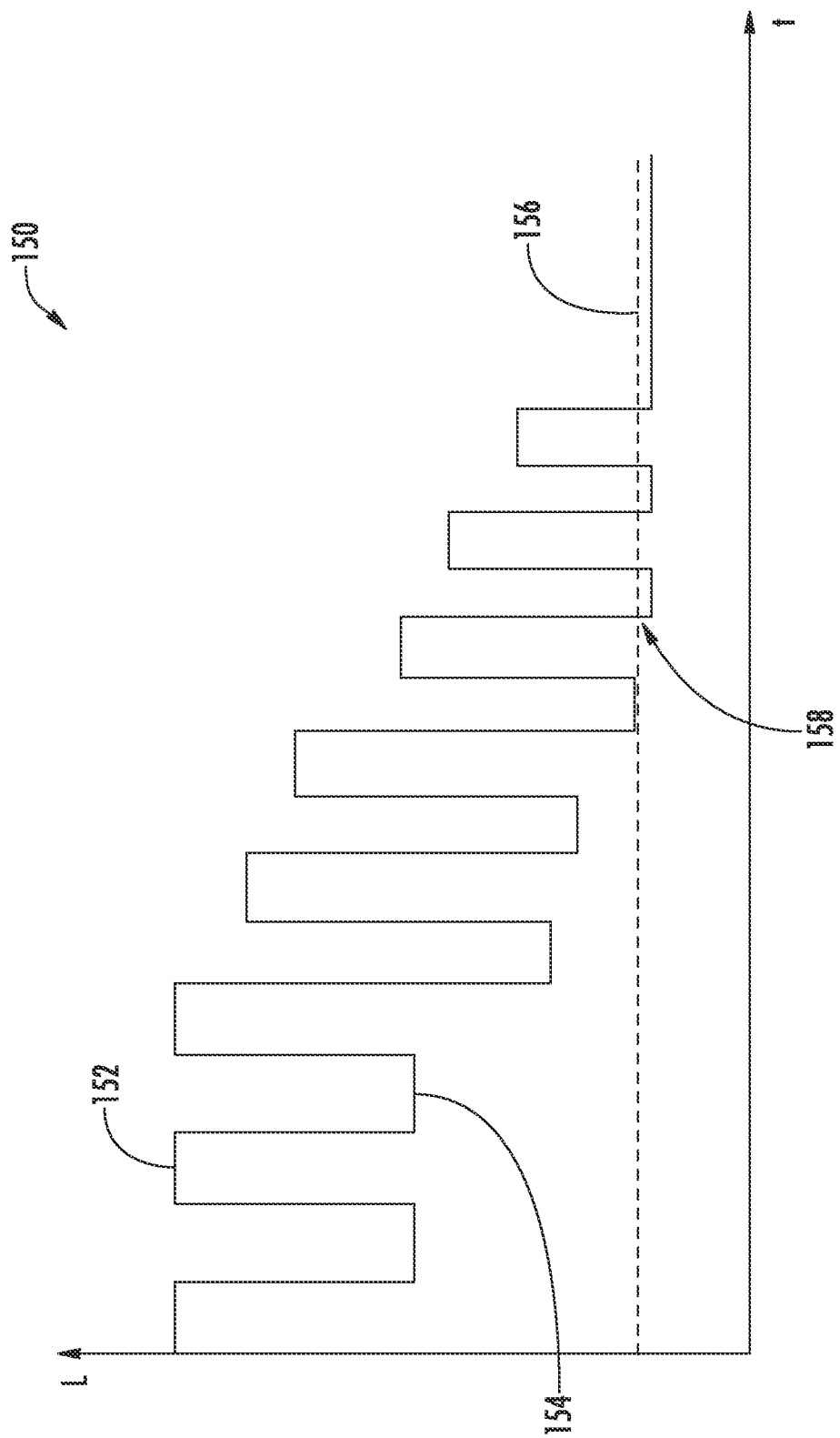
FIG. 6 is a graph depicting light intensity measurements during operation of a confined laser drill in accordance with an exemplary embodiment of the present disclosure.

For example, in certain exemplary aspects, sensing a characteristic of light at (124) may include sensing an intensity of light. For illustration, reference will now also be made to FIG. 6, providing a graph 150 of exemplary light intensity values sensed at (124). The exemplary graph 150 depicts an intensity of light on the Y-axis and a time on the X-axis. In such an exemplary aspect, determining one or more operational conditions at (126) may include determining one or both of a reflected pulse rate of the confined laser drill and a reflected pulse width (measured in units of time) of the confined laser drill based on the intensity of light directed along the beam axis A away from the airfoil sensed at (124). For example, as shown in FIG. 6, the sensed intensity of light at (124) during drilling operations—i.e. during operation of the confined laser drill 62—reveals peaks 152 and valleys 154. The reflected pulse rate may therefore be determined by counting the number of peaks 152 per unit of time and the reflected pulse width may be determined by determining by the timing of the peaks 152.

Notably, if all of the light directed at the airfoil was reflected without being absorbed or otherwise altered, the reflected pulse rate and reflected pulse width would accurately reflect an actual pulse rate and an actual pulse width at which the confined laser drill and confined laser beam is operating. However, during drilling operations, an amount of light absorption by the airfoil may vary based on, e.g., a depth of the hole, an aspect ratio of the hole (which, as used herein, refers to a ratio of a hole diameter verses a hole length), and/or the material into which the confined laser beam is being directed (i.e., the material being drilled through). Accordingly, during drilling operations, the exemplary method (120) may include comparing the values of one or both of the reflected pulse rate and reflected pulse width determined at (126) to known operational conditions of the confined laser drill (e.g., the actual pulse rate and/or actual pulse width of the confined laser drill). Such a comparison may reveal an error value. The error value may then be compared to a lookup table relating such error values to hole depths—accounting for the particular material being drilled into, the hole diameter, the hole geometry, and any other relevant factors—to determine a depth of the hole being drilled by the confined laser drill in the near wall of the airfoil. The lookup table values may be determined experimentally.

Figure 7:
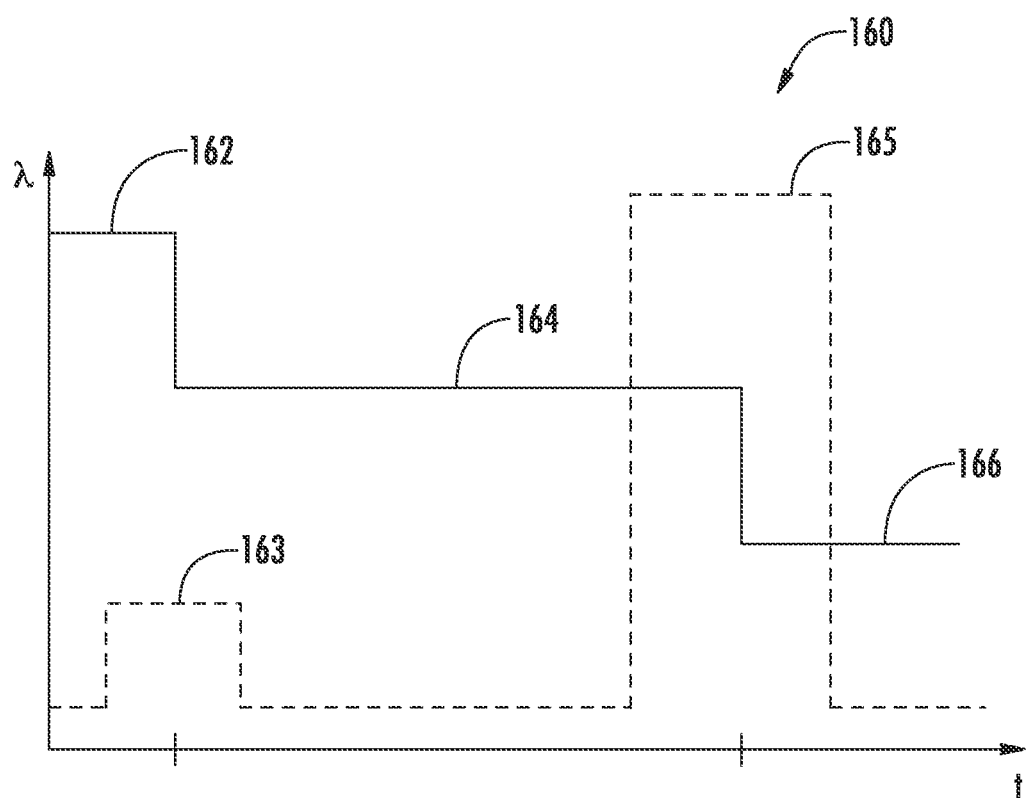
FIG. 7 is a graph depicting wavelength measurements during operation of a confined laser drill in accordance with an exemplary embodiment of the present disclosure.

It should be appreciated, however, that in other exemplary aspects of the present disclosure, the exemplary method may additionally or alternatively sense at (124) other characteristics of light directed along the beam axis and determine at (126) other operational conditions. For example, referring still to FIG. 5, as well as to an exemplary graph 160 of sensed light wavelength values provided in FIG. 7, sensing a characteristic of light at (124) may additionally, or alternatively, include sensing a wavelength of light directed along the beam axis away from the airfoil with the sensor. In such an exemplary aspect, the one or more operational conditions determined at (126) may include the material into which the confined laser beam the confined laser drill is being directed. Additionally, determining the one or more operational conditions at (126) may include comparing the sensed wavelength of light to predetermined values. More specifically, different materials absorb and reflect light at different wavelengths. Accordingly, the reflected light directed along the beam axis during drilling operations may define a wavelength indicative of the material into which the confined laser beam is directed. For example, referring specifically to FIG. 7, light directed along the beam axis when drilling into a thermal barrier coating of an airfoil may define a first wavelength 162, light directed along the beam axis when drilling into a metal portion of the airfoil may define a second wavelength 164, and light directed along the beam axis after the confined laser beam has broken through the near wall of the airfoil may define a third wavelength 166. Accordingly, in such an exemplary aspect, the method (120) may determine the layer into which the confined laser beam is drilling based at least in part on the sensed wavelength of reflected light along the beam axis.

In other exemplary aspects, however, the method (120) may include sensing light at a plurality of wavelengths. For example, light directed along the beam axis when drilling through both the thermal barrier coating and the metal portion may additionally define a fourth wavelength 163 and light directed along the beam axis when drilling through the metal portion and when at least partially broken through the near wall of the airfoil may additionally define a fifth wavelength 165. Moreover, in other exemplary embodiments, the light may define any other distinct pattern of wavelengths based on a variety of factors, including the material(s) into which the confined laser drill is directed, the depth of the hole being drilled, an aspect ratio of the hole being drilled, etc. Accordingly, the method (120) may include utilizing a fuzzy logic methodology to determine the one or more operational conditions at (126), including, for example, the material into which the confined laser beam is being directed.

Figure 8:
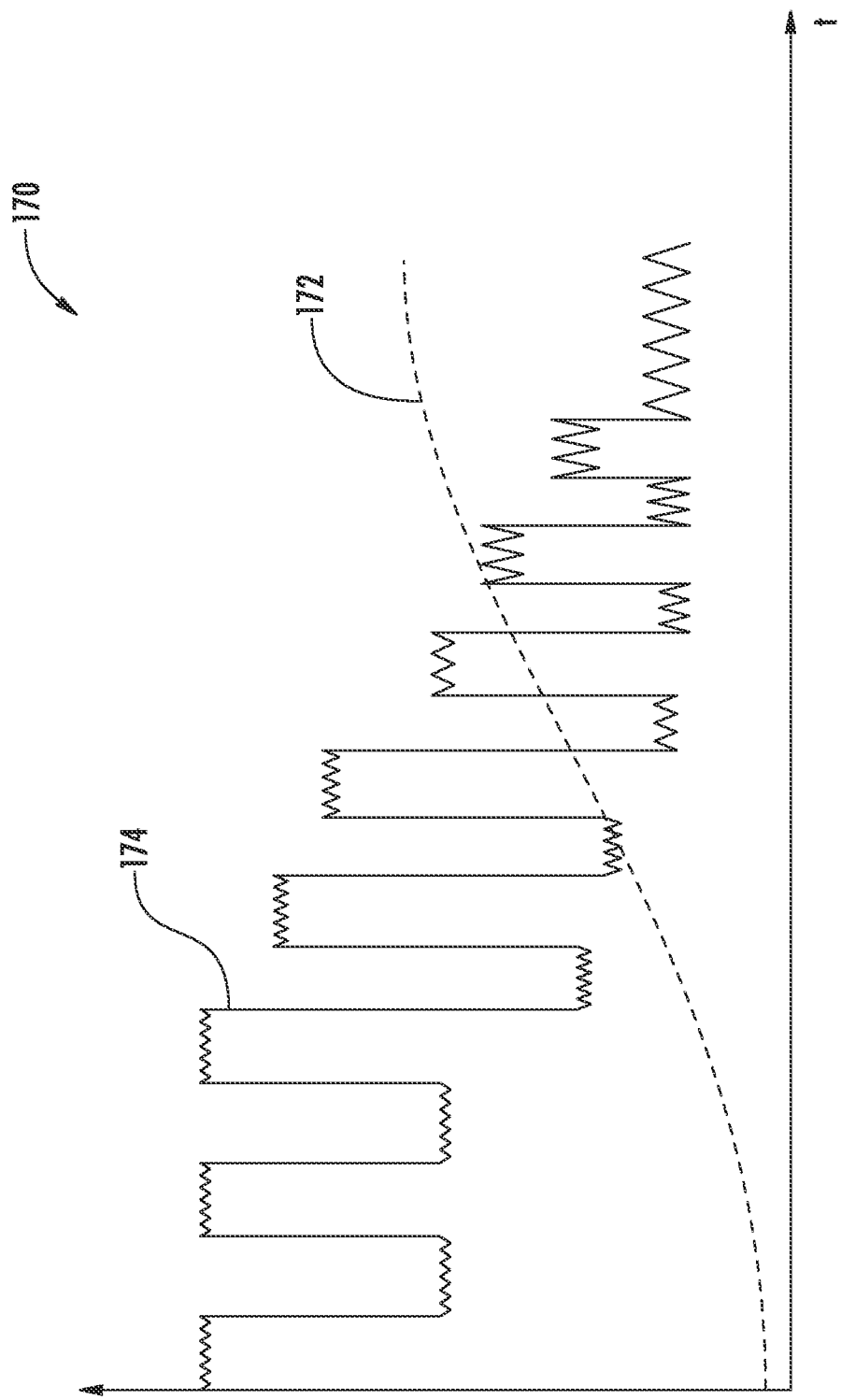
FIG. 8 is a graph depicting noise in light intensity measurements during operation of a confined laser drill in accordance with an exemplary embodiment of the present disclosure.

Moreover, in still other exemplary aspects of the present disclosure, the exemplary method may additionally or alternatively sense at (124) still other characteristics of light directed along the beam axis and determine at (126) other operational conditions. For example, referring still to FIG. 5, as well as to an exemplary graph 170 of sensed noise in light intensity values provided in FIG. 8, sensing a characteristic of light at (124) may additionally, or alternatively, include sensing noise in the intensity of light directed along the beam axis away from the airfoil with the sensor. More particularly, the exemplary graph 170 of FIG. 8 depicts with line 172 a sensed noise level in the light intensity and with line 174 a sensed light intensity. In such an exemplary aspect, determining one or more operational conditions at (126) may additionally, or alternatively, include sensing/determining a noise level in the intensity of light directed along the beam axis away from the airfoil. As used herein, the term "noise level" refers to a fluctuation in the sensed intensity of light, or other characteristic, with the sensor. Additionally, in such an exemplary aspect, determining one or more operational conditions at (126) may further include determining a depth of the hole being drilled based on the determined noise level in the intensity of light directed along the beam axis away from the airfoil. More particularly, it has been determined that during confined laser drilling of certain airfoils and other components of gas turbines, an increased amount of noise in the light intensity sensed along the beam axis at (124) is caused by factors such as a depth of the hole being drilled and an aspect ratio of the hole being drilled. Accordingly, by sensing the noise level in the intensity of light directed along the beam axis away from the near wall of the airfoil, a depth of the hole may be determined by comparing such noise level to, e.g., a lookup table relating hole depths to noise levels in light intensity, taking into consideration the particular hole being drilled, and any other relevant factor. These lookup table values may be determined experimentally.

Referring still to FIG. 5, the exemplary method further includes at (128) determining an indicated breakthrough of the confined laser beam of the confined laser drill through the near wall the airfoil of the gas turbine. Determining the indicated breakthrough at (128) may also be based on the characteristic of light sensed along the beam axis with the sensor at (124). Referring again to graph 150 of FIG. 6, when the intensity of light is sensed at (124), the sensed intensity of light may decrease during the drilling of the hole. Accordingly, the exemplary method (120) may determine an indicated breakthrough at (128) of the confined laser beam of the confined laser drill through the near wall of the airfoil based on a sensed intensity of light falling below a predetermined threshold/breakthrough value. For example, when the predetermined threshold/breakthrough value is equal to line 156, the method (120) may determine an indicated breakthrough at (128) at point 158 on graph 150. This predetermined threshold/breakthrough value may be determined experimentally or based on known values.

The method of FIG. 5 further includes at (130) determining a breakthrough of the confined laser beam 64 through the near wall 66 of the airfoil based on, e.g., the indicated breakthrough determined at (128) and/or the operational conditions determined at (126). For example, the exemplary method (120) of FIG. 5 may determine a breakthrough of the confined laser beam at (130) subsequent to determining an indicated breakthrough at (128) and determining one or more operational characteristics at (126). More particularly, the exemplary method (120) of FIG. 5 may determine a breakthrough the confined laser beam at (130) once an indicated breakthrough has been determined at (128), in addition to one or more operational conditions determined at (126) meeting a predetermined criteria—e.g., the depth of the hole being greater than a predetermined value, or the material into which the confined laser beam is directed not being the metal part or the thermal barrier coating. A method for drilling a hole in accordance with such an exemplary aspect may allow for more accurate breakthrough detection in confined laser drilling.

Notably, although a portion of the confined laser beam may have broken through the near wall the airfoil, the hole may not be complete. More particularly, the hole may not yet define a desired geometry along an entire length of the hole. Accordingly, for the exemplary aspect depicted, the exemplary method (120) of FIG. 5 further includes at (132) continuing to direct the confined laser beam towards the near wall of the airfoil subsequent to determining a breakthrough of the confined laser beam at (130). The method (120) may continue sensing a characteristic of light, such as an intensity of light, a wavelength of light, or a noise in the intensity of light, directed along the beam axis away from the airfoil with the sensor. Moreover, the method (120) includes at (134) determining a completion of the hole in the near wall of the airfoil based on the characteristic of light sensed along the beam axis with the sensor. For example, determining the completion of the hole at (134) may include determining an indicated completion based on the sensed intensity of reflected light along the beam axis; a reflected pulse rate and/or reflected pulse width of reflected light along the beam axis; a wavelength of reflected light on beam axis; and/or an amount of noise in the intensity of light reflected the one beam axis.

The exemplary method of FIG. 5 further includes at (136) changing an operational parameter of the confined laser drill, such as a power of the confined laser drill, a pulse rate of the confined laser drill, or a pulse width of the confined laser drill, based on the determined operational condition at (126), based on the determined indicated breakthrough at (128), and/or based on determining a breakthrough at (130). For example, the method (120) may include changing an operational perimeter at (136) in response to determining the confined laser beam of the confined laser drill is being directed into the metal part of the airfoil versus the thermal barrier coating of the airfoil; determining an indicated breakthrough at (128); and/or determining an initial breakthrough of the confined laser beam at (130).

Sensor Positioned Outside the Component Directed Inside the Component

Figure 9:
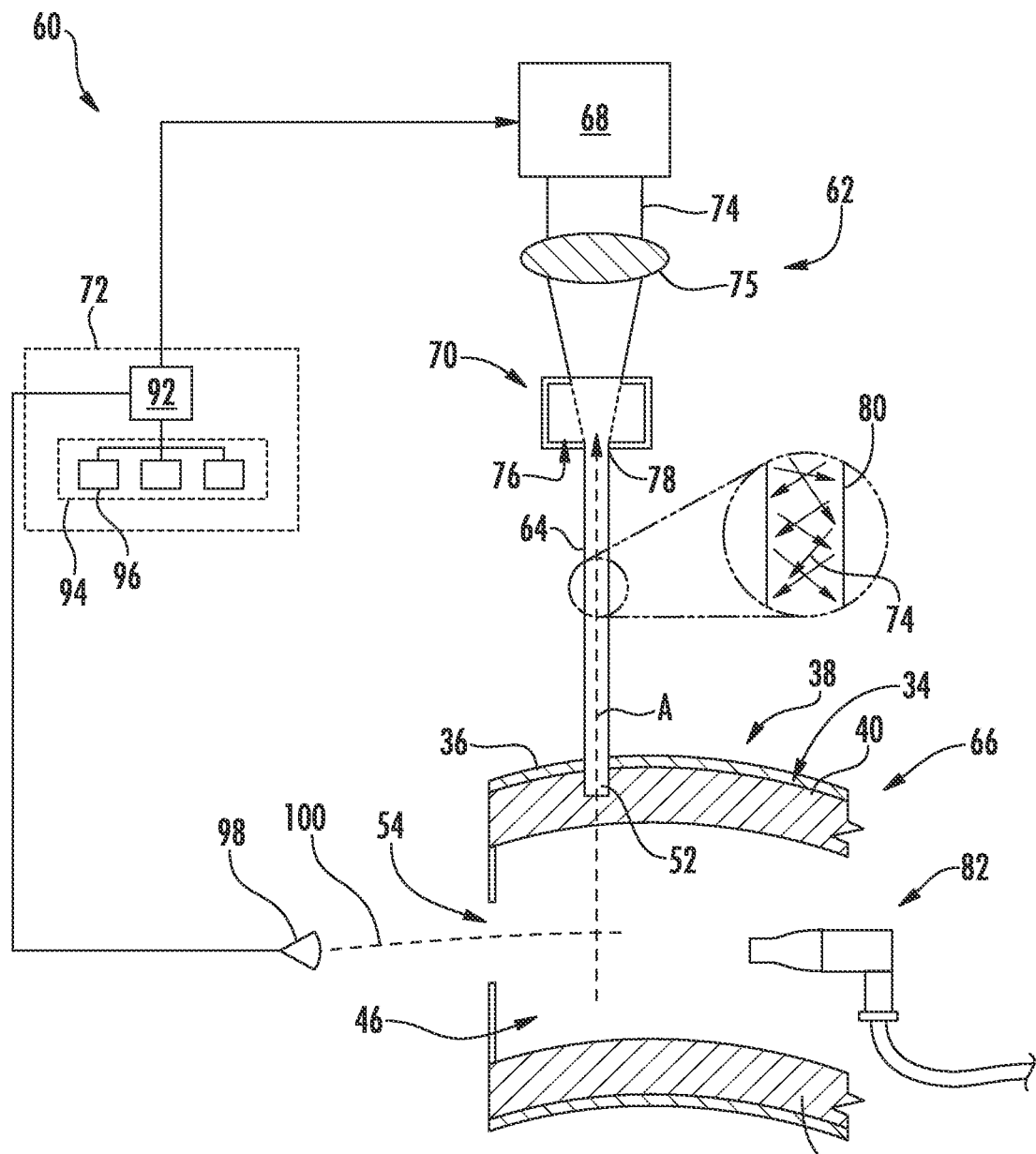
FIG. 9 is a schematic view of a system for manufacturing an airfoil according to another exemplary embodiment of the present disclosure.
Figure 10:
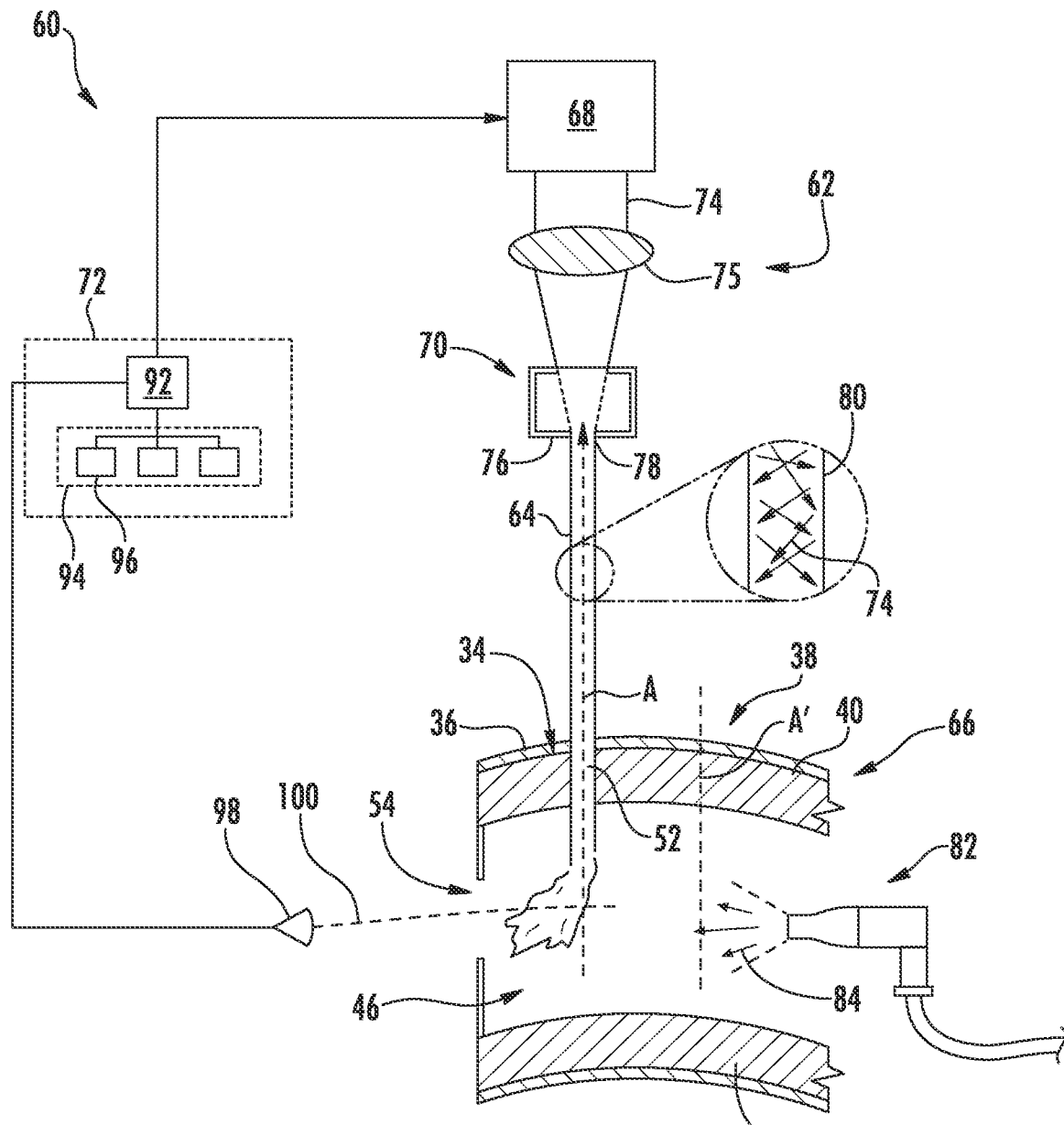
FIG. 10 is a schematic view of the exemplary system of FIG. 9 after a confined laser beam has broken through a near wall of the airfoil.

Referring now to FIGS. 9 and 10 a system 60 in accordance with another exemplary embodiment of the present disclosure is provided. More particularly, FIG. 9 provides a schematic view of a system 60 in accordance with another exemplary embodiment the present disclosure prior to a confined laser beam 64 of a confined laser drill 62 having broken through a near wall 66 of an airfoil 38, and FIG. 10 provides a schematic view of the exemplary system 60 of FIG. 9 after the confined laser beam 64 of the confined laser drill 62 has broken through the near wall 66 of the airfoil 38. Although discussed in the context of an airfoil 38, in other embodiments, system 60 may be used with any other suitable component of a gas turbine.

The exemplary system 60 depicted in FIGS. 9 and 10 may be configured in substantially the same manner as the exemplary system 60 of FIGS. 3 and 4, and the same or similar numbering may refer to the same or similar parts. For example, the system 60 includes a confined laser drill 62 utilizing a confined laser beam 64, the confined laser drill 62 configured to drill one or more holes or cooling passages 52 in a near wall 66 of an airfoil 38. Additionally, as depicted, the near wall 66 of the airfoil 38 is positioned adjacent to a cavity 46 defined by the airfoil 38. Moreover, a backstrike protection mechanism 82 is also provided that is configured to protect a far wall 86 of the airfoil 38, the far wall 86 positioned opposite the cavity 46 from the near wall 66.

However, for the embodiment of FIGS. 9 and 10, a sensor 98 is positioned outside the cavity 46 and directed into the cavity 46 for sensing a characteristic of light within the cavity 46. As is discussed in greater detail below, the system 60 is configured to determine a breakthrough of the confined laser beam 64 through the near wall 66 of the airfoil 38 based on the characteristic of light sensed within the cavity 46 of the airfoil 38. In certain exemplary embodiments, the sensor 98 may be, for example, an optical sensor, an oscilloscope sensor, or any other suitable sensor capable of sensing one or more of the following characteristics of light: an amount of light, an intensity of light, and a wavelength of light.

For the embodiment depicted, the sensor 98 is positioned outside the airfoil 38, such that the sensor defines a line of sight 100 to the beam axis A of the confined laser beam 64. As used herein, the term "line of sight" refers to a straight line from one position to another position free from any structural obstacles. Accordingly, the sensor 98 may be positioned anywhere outside the cavity 46 of the airfoil 38 that allows the sensor 98 to define the line of sight 100 to the beam axis A within the cavity 46. For example, in the embodiment depicted, the sensor 98 is positioned adjacent to the opening 54 (shown schematically) of the airfoil 38 and directed through the opening 54 of the airfoil 38 into the cavity 46 of the airfoil 38.

Typically, it is difficult to sense light from a laser beam unless such laser beam is contacting a surface (such that light is reflected and/or redirected) or unless the sensor is positioned in alignment with an axis of the laser beam. For the embodiment depicted, the backstrike protection mechanism 82 is configured to disrupt the confined laser beam 64 within the cavity 46 of the airfoil 38 after the confined laser beam 64 has broken through the near wall 66 of the airfoil 38. More particularly, as previously stated, the confined laser beam 64 includes a liquid column 80 and a laser beam 74 within the liquid column 80. Referring particularly to FIG. 10, when the confined laser beam 64 has broken through the near wall 66 of the airfoil 38, gas 84 flowed through the cavity 46 from the backstrike protection mechanism 82 disrupts the liquid column 80 of the confined laser beam 64 within the cavity 46 of the airfoil 38 such that at least a portion of the liquid from the liquid column 80 intersects the beam axis A and the laser beam 74. The liquid intersecting the beam axis A may be at least partially illuminated by the laser beam 74 of the confined laser beam 64 within the cavity 46. Accordingly, the sensor 98, which is directed into the cavity 46 the airfoil 38, may detect a characteristic of light, such as an intensity of light, from the portion of the liquid illuminated by the laser beam 74.

In certain embodiments, the sensor 98 may be positioned outside the cavity 46 and directed into the cavity 46 such that the sensor 98 is configured to detect light from within the cavity 46 of the airfoil 38 at a plurality of locations. More particularly, the sensor 98 may be positioned outside the cavity 46 and directed into cavity 46 such that the sensor defines a line of sight 100 with the beam axis A of the confined laser beam 64 at a first hole location as well as with a second beam axis A' of the confined laser beam 64 at a second hole location (see FIG. 10). Such an embodiment may allow for more time efficient and convenient drilling of e.g., cooling holes 52 in an airfoil 38 for a gas turbine.

Figure 11:
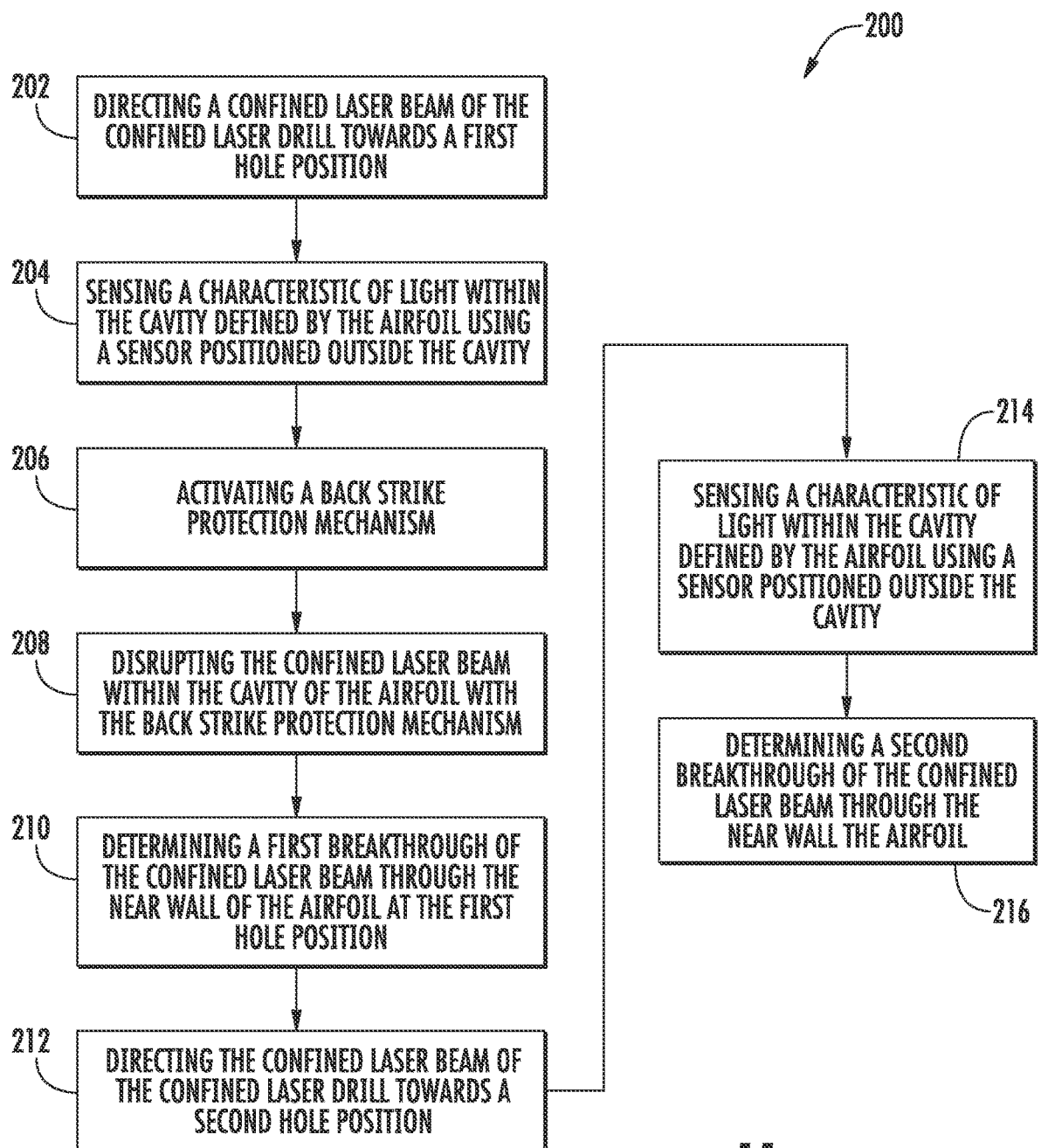
FIG. 11 is a flow diagram of a method for manufacturing an airfoil in accordance with another exemplary aspect of the present disclosure.

Referring now to FIG. 11, a block diagram of an exemplary method (200) for drilling a hole in an airfoil of a gas turbine is provided. The exemplary method (200) of FIG. 11 may be utilized with the exemplary system 60 depicted in FIGS. 9 and 10 and described above. Accordingly, although discussed in the context of drilling a hole in an airfoil, the exemplary method (200) may alternatively be used to drill a hole in any other suitable component of a gas turbine.

As shown, the exemplary method (200) includes at (202) directing a confined laser beam of a confined laser drill towards a first hole position on a near wall of the airfoil. The near wall may be positioned adjacent to a cavity defined in the airfoil. The method also includes at (204) sensing a characteristic of light within the cavity defined by the airfoil using a sensor positioned outside the cavity defined by the airfoil. In certain exemplary aspects, the sensor may be positioned adjacent to an opening defined by the airfoil and directed through the opening into the cavity. The sensor may therefore be positioned at a location that does not intersect with a beam axis defined by the confined laser beam, but defines a line of sight to the beam axis defined by the confined laser beam within the cavity of the airfoil.

The method (200) further includes at (206) activating a backstrike protection mechanism. Activating the back straight protection mechanism at (206) may be, for example, in response to operating the confined laser drill for a predetermined amount of time. Additionally, activating the backstrike protection mechanism at (206) may include flowing a gas through the cavity of the airfoil such that the gas intersects the beam axis within the cavity of the airfoil. Accordingly, once the confined laser beam of the confined laser drill breaks through the near wall of the airfoil, the method (200) further includes at (208) disrupting the confined laser beam within the cavity of the airfoil with the backstrike protection mechanism. More particularly, disrupting the confined laser beam within the cavity at (208) may include disrupting a liquid column of the confined laser beam such that a liquid from the liquid column intersects the beam axis and a laser beam of the confined laser beam. The liquid intersecting the beam axis may be at least partially illuminated by the laser beam of the confined laser beam within the cavity of the airfoil.

The exemplary method of FIG. 11 further includes at (210) determining a first breakthrough of the confined laser beam through the near wall of the airfoil at the first hole position based on the light sensed with the sensor at (204) from within the cavity. In certain exemplary aspects, sensing a characteristic of light at (204) within the cavity with the sensor may include sensing an intensity of light from the portion of the liquid of the confined laser beam illuminated by the laser of the confined laser beam. Further, in such an exemplary aspect, determining the first breakthrough of the confined laser beam at (210) may include determining the first breakthrough the confined laser beam based the sensed intensity of light from the portion of the liquid of the confined laser beam illuminated by the laser beam of the confined laser beam.

Subsequent to determining the first breakthrough of the confined laser beam at (210), the exemplary method may include shutting off the confined laser drill and repositioning the confined laser drill to drill a second cooling hole. Additionally, the exemplary method includes at (212) directing the confined laser beam of the confined laser drill towards a second hole position on the near wall of the airfoil. The method (200) further includes at (214) sensing a characteristic of light within the cavity defined by the airfoil using the sensor subsequent to directing the confined laser beam towards the second hole position at (212). Further, the method (200) of FIG. 11 includes at (216) determining a second breakthrough of the confined laser beam through the near wall the airfoil based on the sensed characteristic of light from within the cavity. Determining the second breakthrough the confined laser beam at (216) may be performed in a manner substantially similar to determining the first breakthrough the confined laser beam at (210). Moreover, for the exemplary aspect depicted, the sensor remains stationary between determining the first breakthrough of the confined laser beam at (210) and determining the second breakthrough of the confined laser beam at (216). For example, the sensor may be positioned such that it defines a line of sight with the beam axis of the confined laser beam at a plurality of hole positions (including the first hole position and the second hole position). It should be appreciated, however, that in other exemplary aspects, the sensor may be moved, relocated, or realigned to maintain or establish a line of sight to subsequent hole positions if, for example, the cooling holes being drilled define a non-linear path.

The exemplary method of FIG. 11 may allow for more time efficient and convenient drilling of a plurality of holes through the near wall of the airfoil using a confined laser drill.

Sensing Liquid Outside the Component

Figure 12:
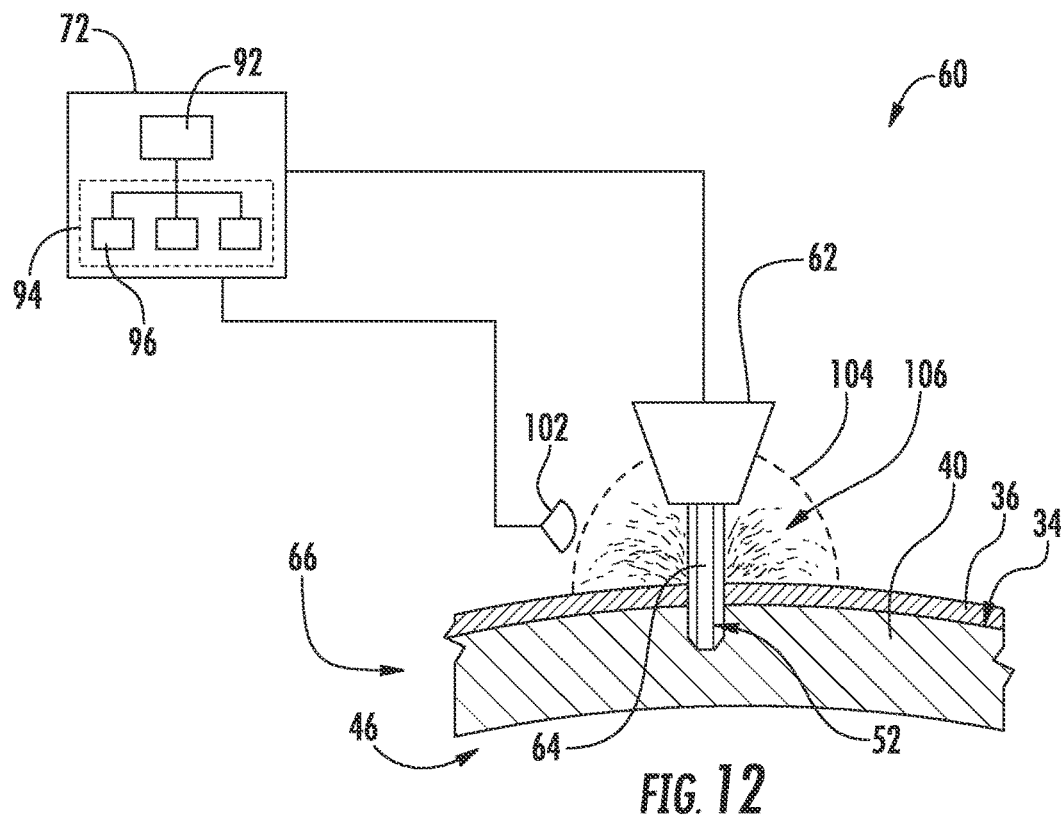
FIG. 12 is a schematic view of a system for manufacturing an airfoil according to yet another exemplary embodiment of the present disclosure.
Figure 13:
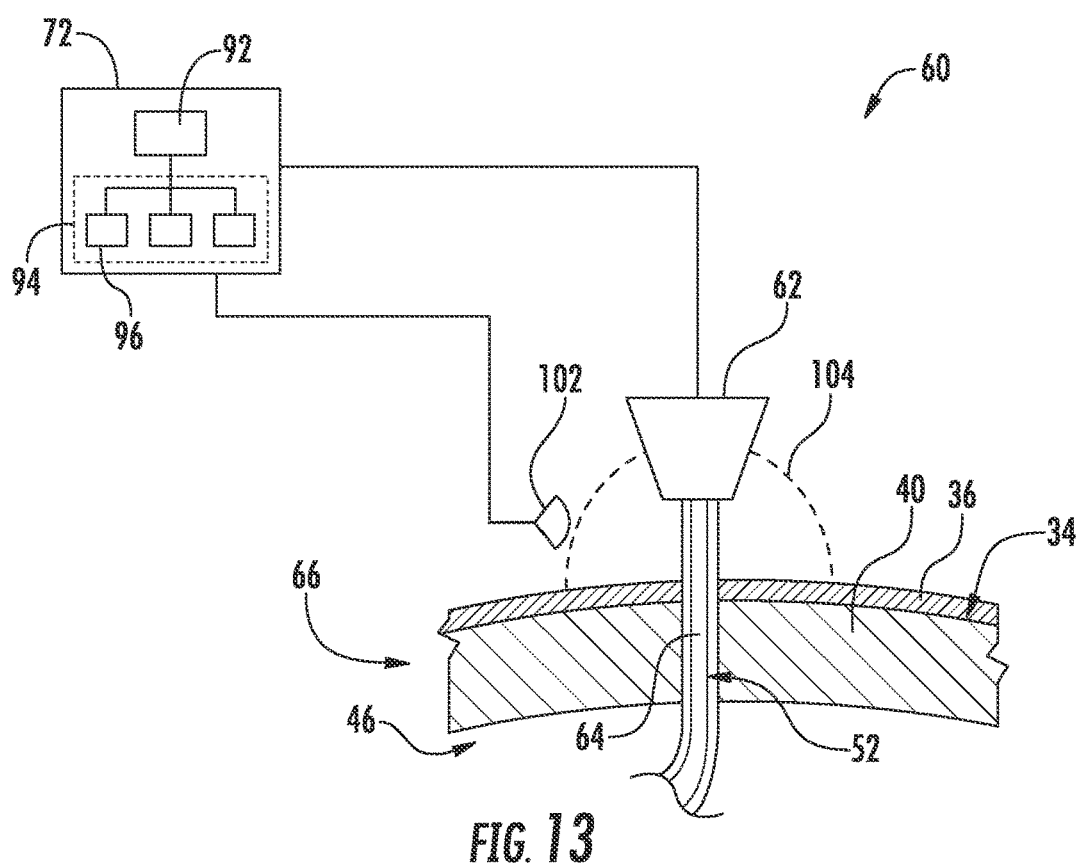
FIG. 13 is a schematic view of the exemplary system of FIG. 12 after a confined laser beam has broken through a near wall of the airfoil.

Referring now to FIGS. 12 and 13, a system 60 in accordance with yet another exemplary embodiment of the present disclosure is provided. More specifically, FIG. 12 provides a schematic view of a system 60 in accordance with another exemplary embodiment present disclosure prior to a confined laser beam 64 of a confined laser drill 62 having broken through a near wall 66 of an airfoil 38. Additionally, FIG. 13 provides a schematic view of the exemplary system 60 of FIG. 12 after the confined laser beam 64 of the confined laser drill 62 has broken through the near wall 66 of the airfoil 38. It should be appreciated, that although the exemplary system 60 of FIGS. 12 and 13 is discussed in the context of an airfoil 38, in other embodiments, system 60 may be used with any other component of a gas turbine.

The exemplary system 60 depicted in FIGS. 12 and 13 may be configured in substantially the same manner as the exemplary system 60 of FIGS. 3 and 4, and the same or similar numbering may refer to the same or similar parts. For example, the exemplary system 60 of FIGS. 12 and 13 includes a confined laser drill 62 (depicted schematically in FIGS. 12 and 13 for simplicity) utilizing a confined laser beam 64. The confined laser beam 64 includes a liquid column 80 formed of a liquid and a laser beam 74 within the liquid column 80. The confined laser drill 62 is configured to drill one or more holes or cooling passages 52 through a near wall 66 of the airfoil 38. For the embodiment depicted, the near wall 66 of the airfoil 38 is positioned adjacent to a cavity 46 defined by the airfoil 38.

However, for the embodiment of FIGS. 12 and 13, the system 60 includes a sensor 102 positioned outside the near wall 66 of the airfoil 38 configured to determine an amount of liquid from the confined laser beam 64 present outside the near wall 66 of the airfoil 38. A controller 72 is in operable communication with the sensor 102. The controller 72 is configured to determine a breakthrough the confined laser beam 64 through the near wall 66 of the airfoil 38 based on the amount of liquid determined to be present by the sensor 102. More particularly, prior to the confined laser beam 64 having broken through the near wall 66 of the airfoil 38, liquid from the liquid column 80 of the confined laser beam 64 may spray back away from the near wall 66 of the airfoil 38 during drilling operations (i.e., during operation of the confined laser drill 62). The liquid from the confined laser beam 64 may form a plume 106 of liquid back-spray surrounding the hole 52 being drilled in the near wall 66 of the airfoil 38. The plume 106 may be positioned in a backsplash area 104 defined by the system 60. Additionally, in certain exemplary embodiments, such as in the embodiment of FIGS. 12 and 13, the confined laser drill 62 may be positioned within a relatively close proximity to the near wall 66 of the airfoil 38, such that the confined laser drill 62 is positioned within the backsplash area 104. For example, in certain embodiments, the confined laser drill 62 may define a clearance with the near wall 66 of the airfoil 38 of between about five millimeters ("mm") and about twenty-five mm, such as between about seven mm and about twenty mm, such as between about ten mm and about fifteen mm. However, in other embodiments, the confined laser drill 62 may define any other suitable clearance with the near wall 66 of the airfoil 38.

By contrast, after the confined laser drill 62 has broken through the near wall 66 of the airfoil 38 (FIG. 13), liquid from the liquid column 80 of the confined laser beam 64 may flow through the drilled hole 52 and into the cavity 46 of the airfoil 38. Accordingly, after the confined laser beam 64 has broken through the near wall 66 of the airfoil 38, the confined laser drill 62 may not define the plume 106 of liquid back-spray in the backsplash area 104, or alternatively, the plume 106 may be smaller or otherwise define a different shape as compared to its size and shape prior to the confined laser beam 64 having broken through the near wall 66 of the airfoil.

For the embodiment of FIGS. 12 and 13, the sensor 102 may be configured as any sensor capable of determining an amount of liquid from the confined laser beam 64 present outside the near wall 66 of the airfoil 38. For example, in certain exemplary aspects, the sensor 102 may include a camera. When the sensor 102 includes a camera, the camera of the sensor 102 may be directed at the confined laser drill 62, or alternatively the camera of the sensor 102 may be directed at the hole 52 in the near wall 66 of the airfoil 38. In either of these embodiments, the sensor 102 may be configured to utilize an image recognition method to determine whether or not a predetermined amount of liquid is present in the backsplash area 104. For example, the sensor 102 may be configured to compare one or more images received from the camera of the sensor 102 to one or more stored images to determine the amount of liquid present. More particularly, the sensor 102 may be configured to compare one or more images received from the camera to one or more stored images of the confined laser drill 62 or of the hole 52 with an amount of liquid present indicative of the confined laser beam 64 having broken through the near wall 66 of the airfoil 38.

It should be appreciated, however, that in other exemplary embodiments, any other suitable sensor 102 may be provided. For example, in other exemplary embodiments the sensor 102 may be a motion sensor, a humidity sensor, or any other suitable sensor. When the sensor 102 is a motion sensor, for example, the sensor may determine whether or not a plume 106 of liquid back spray is present in the backsplash area 104. A breakthrough may be determined when the plume 106 of liquid back spray is no longer present in the backsplash area 104.

Figure 14:
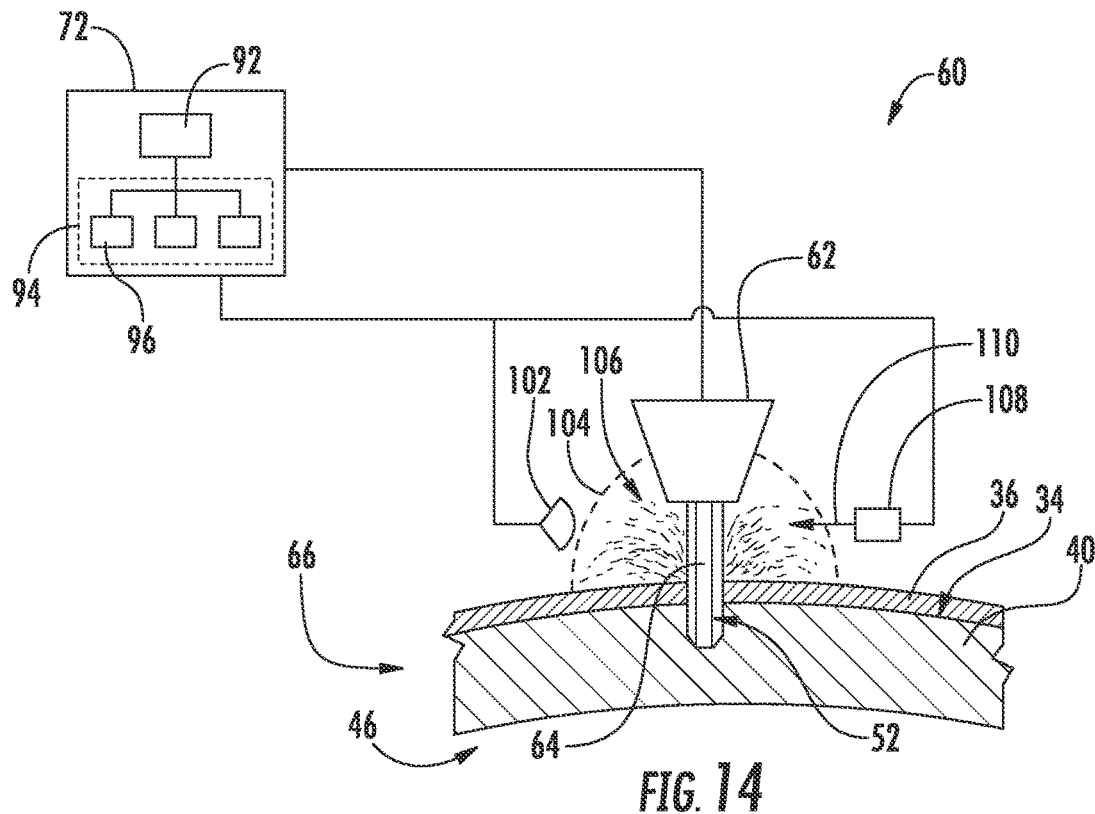
FIG. 14 is a schematic view of a system for manufacturing an airfoil according to still another exemplary embodiment of the present disclosure.
Figure 15:
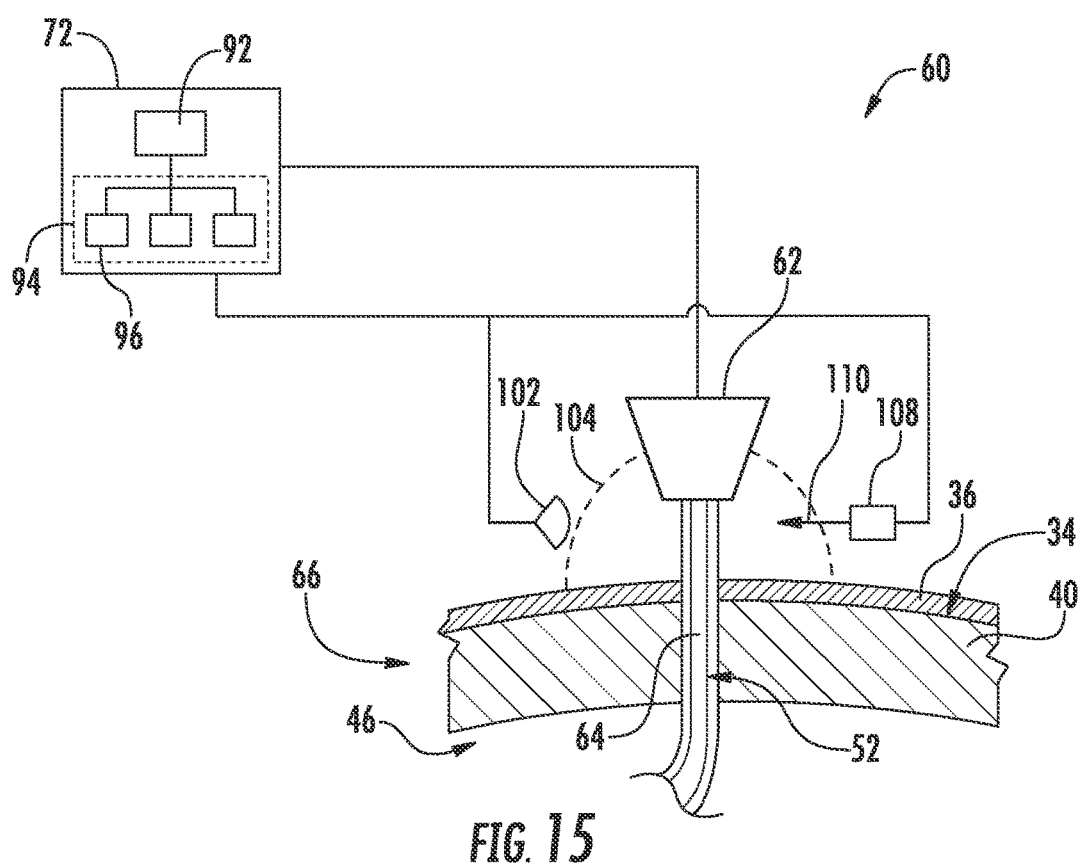
FIG. 15 is a schematic view of the exemplary system of FIG. 14 after a confined laser beam has broken through a near wall of the airfoil.

Referring now to FIGS. 14 and 15, a system 60 in accordance with still another exemplary embodiment is provided. The exemplary system 60 of FIGS. 14 and 15 is configured in substantially the same manner as the exemplary system 60 of FIGS. 12 and 13. However, for the exemplary embodiment of FIGS. 14 and 15, the sensor 102 is configured as an optical sensor and the system 60 further includes a light source 108 separate from the confined laser drill 62. The light source 108 may be any suitable light source. For example, the light source 108 may be one or more LED bulbs, one or more incandescent lamps, one or more electroluminescent lamps, one or more lasers, or combination thereof.

As stated, the confined laser drill 62 defines a backsplash area 104 where liquid from the confined laser beam 64 sprays prior to the confined laser beam 64 breaking through the near wall 66 of the airfoil 38. For the embodiment depicted, the light source 108 is positioned outside the airfoil 38 and configured to direct light through at least a portion of the backsplash area 104. Additionally, for the embodiment depicted, the light source 108 is positioned directly opposite the backsplash area 104 from the sensor 102, the light source 108 is directed at the sensor 102, and the sensor 102 is directed at the light source 108. However, in other exemplary embodiments the light source 108 and sensor 102 may be offset from one another relative to the backsplash area 104, the light source 108 may not be directed at the sensor 102, and/or the sensor 102 may not be directed at the light source 108.

As stated, for the embodiment depicted the sensor 102 is directed at the light source 108 and the light source 108 is directed at the sensor 102, such that an axis 110 of the light source intersects with the sensor 102. In such an embodiment, sensing an intensity of light above a predetermined threshold may indicate a decreased amount of liquid from the confined laser beam 64 is present outside the airfoil 38 and thus that the confined laser beam 64 has broken through the near wall 66 of the airfoil 38. More particularly, when liquid is present in the backsplash area 104, such liquid may disrupt or redirect light from the light source 108 such that an intensity of light sensed by the sensor 102 is relatively low. By contrast, when no liquid, or a minimal amount of liquid, is present in the backsplash area 104, the amount of disruptions are limited between the light source 108 and the sensor 102, such that a relatively high intensity of light may be sensed by the sensor 102. Accordingly, with such a configuration, sensing a relatively high intensity of light may indicate the confined laser beam 64 has broken through the near wall 66 of the airfoil 38.

In other exemplary embodiments, however, such as when the light source 108 is not directed at the sensor 102 and the sensor 102 is not directed at the light source 108, sensing an intensity of light below a predetermined threshold indicates a decreased amount of liquid from the confined laser beam 64 is present outside the airfoil 38. More particularly, when the light source 108 is not directed at the sensor 102 and the sensor 102 is not directed to light source 108, the sensor 102 may sense an increased intensity of light when light from the light source is redirected and reflected by liquid in the backsplash area 104. However, when no liquid, or a minimal amount of liquid, is present in the backsplash area 104, light from the light source is not redirected or reflected by such liquid and the sensor 102 may therefore sense a relatively low intensity of light. Accordingly, in such an exemplary embodiment, sensing an intensity of light below a predetermined threshold may indicate that the confined laser beam 64 has broken through the near wall 66 of the airfoil 38.

Figure 16:
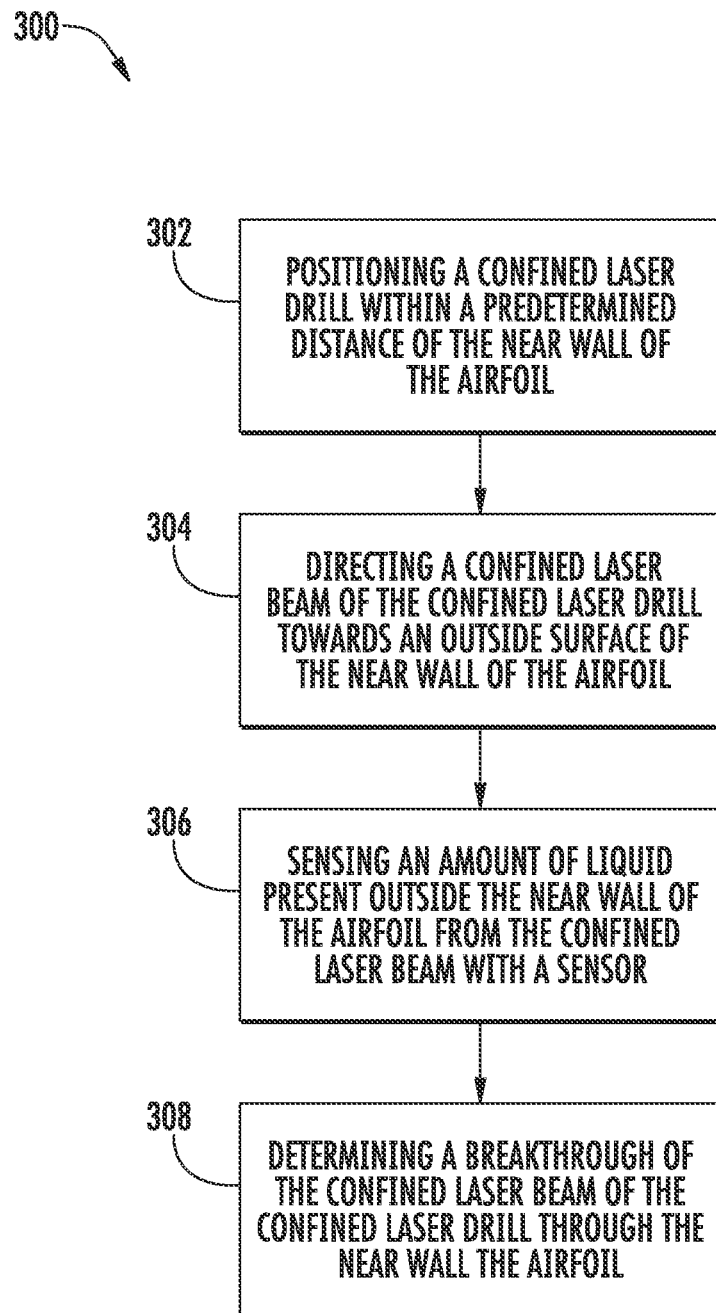
FIG. 16 is a flow diagram of a method for manufacturing an airfoil in accordance with still another exemplary aspect of the present disclosure.

Referring now to FIG. 16, a block diagram of an exemplary method (300) for drilling a hole in an airfoil of a gas turbine is provided. The exemplary method (300) of FIG. 16 may be utilized with the exemplary system 60 depicted in FIGS. 12 and 13 and/or the exemplary system 60 depicted in FIGS. 14 and 15, each described above. Accordingly, although discussed in the context of drilling a hole in an airfoil, the exemplary method (300) may alternatively be used to drill a hole in any other suitable component of a gas turbine.

As shown, the exemplary method (300) includes at (302) positioning a confined laser drill within a predetermined distance of a near wall of an airfoil of a gas turbine. The exemplary method (300) also includes at (304) directing a confined laser beam of the confined laser drill towards an outside surface of the near wall of the airfoil. The confined laser beam includes a liquid column formed of a liquid and a laser beam within the liquid column. The exemplary method (300) also includes at (306) sensing an amount of liquid present outside the near wall of the airfoil from the confined laser beam with a sensor. Moreover, the exemplary method (300) includes at (308) determining a breakthrough of the confined laser beam of the confined laser drill through the near wall the airfoil of the gas turbine based on the amount of liquid sensed outside the near wall of the airfoil at (306).

In certain exemplary aspects, wherein the sensor includes a camera, sensing an amount of liquid present outside the near wall the airfoil at (306) may include comparing one or more images received from the camera to one or more stored images to determine the amount of liquid present. Any suitable pattern recognition software may be utilized to provide such functionality.

Utilizing a Plurality of Sensors

Figure 17:
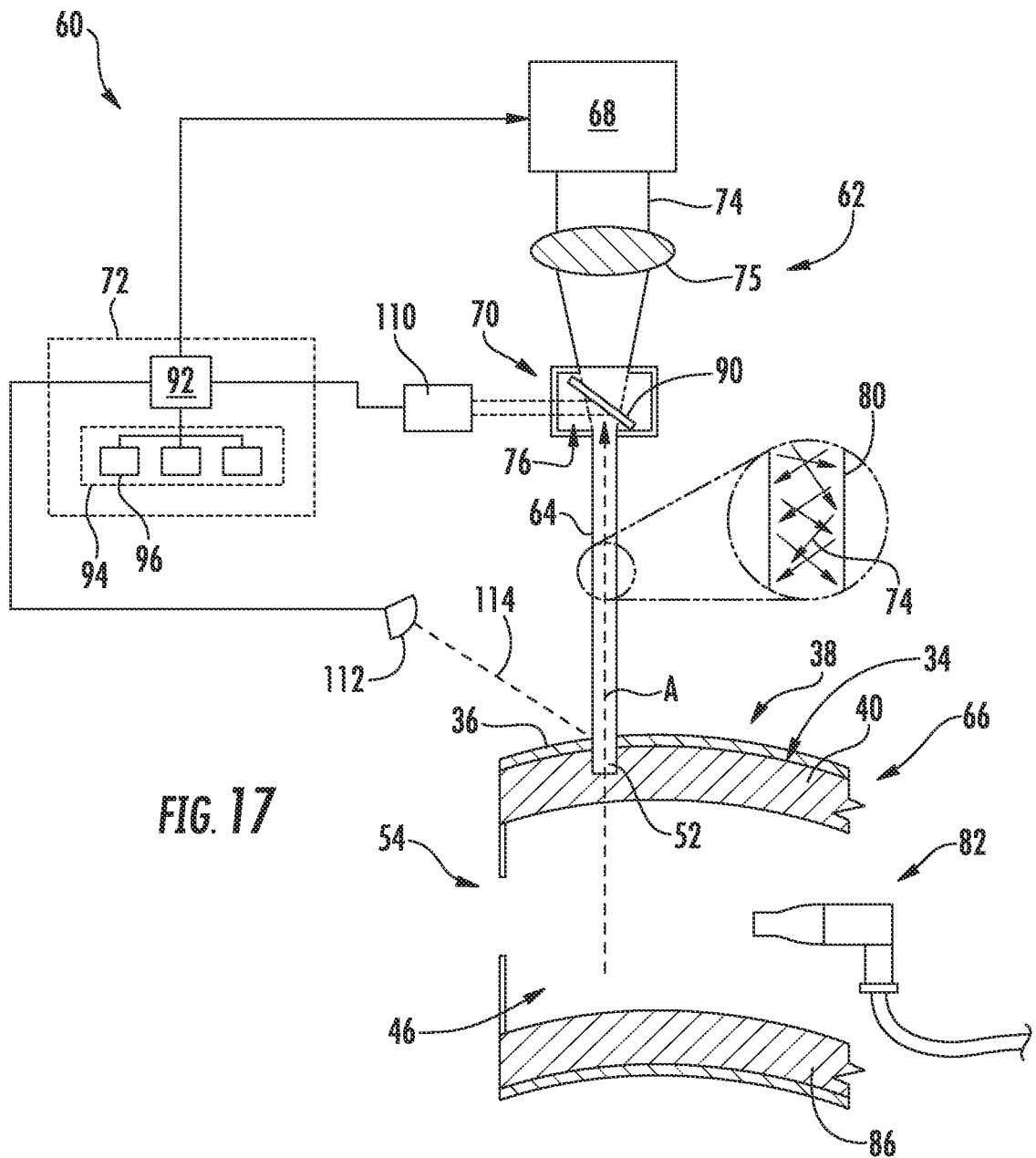
FIG. 17 is a schematic view of a system for manufacturing an airfoil according to yet another exemplary embodiment of the present disclosure.

Referring now to FIG. 17, a system 60 in accordance with another exemplary embodiment of the present disclosure is provided. It should be appreciated, that although the exemplary system 60 of FIG. 17 is discussed in the context of an airfoil 38, in other embodiments, system 60 may be used with any other component of a gas turbine.

The exemplary system 60 of FIG. 17 may be configured in substantially the same manner as the exemplary system 60 of FIGS. 3 and 4, and the same or similar numbering may refer to the same or similar parts. For example, the exemplary system 60 of FIG. 17 includes a confined laser drill 62 utilizing a confined laser beam 64. The confined laser drill 62 is configured to drill a hole 52 through a near wall 66 of the airfoil 38. The near wall 66, as shown, is positioned adjacent to a cavity 46 defined by the airfoil 38. The system 60 also includes a controller 72.

The exemplary system 60 of FIG. 17 further includes a first sensor 110 configured to sense a first characteristic of light from the hole 52 in the near wall 66 of the airfoil 38. The exemplary system 60 additionally includes a second sensor 112 configured to sense a second characteristic of light from the hole and the near wall 66 of the airfoil 38. The second characteristic of light is different from the first characteristic of light. Additionally, the controller 72 is operably connected to the first sensor 110 and the second sensor 112, and is configured to determine a progress of the hole 52 being drilled by the confined laser drill 62 based on the sensed first characteristic of light and the sensed second characteristic of light.

For the embodiment depicted in FIG. 17, the first sensor 110 is positioned outside the airfoil 38 and is further positioned to sense light reflected and/or redirected from the hole 52 along a beam axis A, i.e., directed along the beam axis A away from the near wall 66 of the airfoil 38. For example, the first sensor 110 may be configured in substantially the same manner as the sensor 88 described above with reference to FIGS. 3 and 4. Accordingly, the first sensor 110 may be an oscilloscope sensor or any other suitable optical sensor.

Moreover, for the embodiment of FIG. 17, the second sensor 112 is also positioned outside the airfoil 38 and directed towards the hole 52 in the near wall 66 of the airfoil 38. More particularly, the second sensor 112 is positioned such that the second sensor 112 defines a line of sight 114 with the hole 52, the line of sight 114 extending in a direction nonparallel to the beam axis A. Second sensor 112 may, in certain embodiments, be an optical sensor configured to sense one or more of an intensity of light, a wavelength of light, and an amount of light.

As will be explained in greater detail below with reference to FIG. 18, in certain exemplary embodiments, the first characteristic of light may be an intensity of light at a first wavelength and the second characteristic of light may be an intensity of light at a second wavelength. Sensing light at the first wavelength may be indicative of the confined laser beam 64 hitting a first layer, such as a thermal barrier coating 36, of the near wall 66 of the airfoil 38. By contrast, sensing light at the second wavelength may be indicative of the confined laser beam 64 hitting a second layer, such as a metal portion 40, of the near wall 66 of the airfoil 38. The controller 72 may be configured to compare the intensity of light sensed at the first wavelength by the first sensor 110 to the intensity of light sensed at the second wavelength by the second sensor 112 to determine a progress of the hole 52.

It should be appreciated, however, that in other exemplary embodiments of the present disclosure, the first sensor 110 and the second sensor 112 may be positioned at any other suitable location. For example, in other exemplary embodiments, first sensor 110 and the second sensor 112 may each be positioned to sense light directed along the beam axis A away from the near wall 66 of the airfoil 38. Alternatively, the first sensor 110 and the second sensor 112 may each be positioned such that each respective sensor 110, 112 defines a line of sight to the hole in the near wall 66 of the airfoil 38 nonparallel to the beam axis A. Alternatively, one or both of the first sensor 110 and the second sensor 112 may be positioned outside the cavity 46 of the airfoil 38 and directed into the cavity 46 of the airfoil 38 (similar to, e.g., sensor 98 discussed above with reference to FIGS. 9 and 10) or may be positioned within the cavity 46 of the airfoil 38. Alternatively, one or both of the first sensor 110 and the second sensor 112 may be positioned outside of the airfoil 38 and directed to an ambient surface to detect reflected light from the hole 52 on said ambient surface. Alternatively still, in certain exemplary embodiments, the first sensor 110 and the second sensor 112 may each be integrated into a single sensing device at any suitable location.

Figure 18:
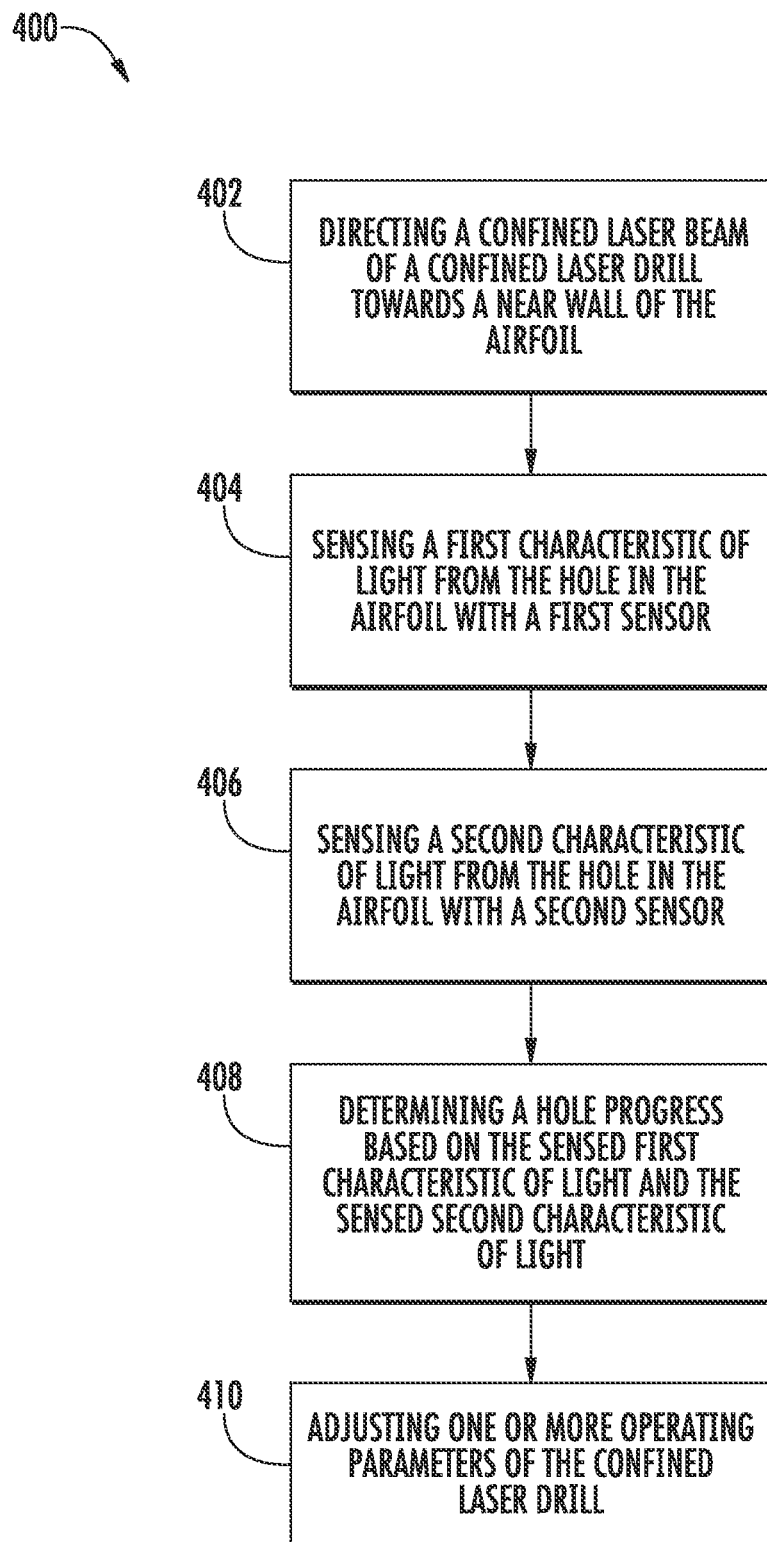
FIG. 18 is a flow diagram of a method for manufacturing an airfoil in accordance with yet another exemplary aspect of the present disclosure.

Referring now to FIG. 18, a block diagram of an exemplary method (400) for drilling a hole in an airfoil of a gas turbine is provided. The exemplary method (400) of FIG. 18 may be utilized with the exemplary system 60 depicted in FIG. 17 and described above. Accordingly, although discussed in the context of drilling a hole in an airfoil, the exemplary method may alternatively be used to drill a hole in any other suitable airfoil of a gas turbine.

The exemplary method (400) of FIG. 18 includes at (402) directing a confined laser beam of a confined laser drill towards a near wall of the airfoil. The near wall is positioned adjacent to a cavity defined in the airfoil and the confined laser beam defines a beam axis. The exemplary method (400) additionally includes at (404) sensing a first characteristic of light from the hole in the airfoil with a first sensor. In certain exemplary aspects, the first sensor may be positioned outside the airfoil, and the first characteristic of light may be an intensity of light at a first wavelength. Sensing light at the first wavelength may be indicative of the confined laser beam hitting, or being directed into, a first layer of the near wall of the airfoil. For example, sensing light at the first wavelength may be indicative of the confined laser beam hitting a thermal barrier coating of the near wall of the airfoil.

The exemplary method (400) also includes at (406) sensing a second characteristic of light from the hole in the airfoil with a second sensor. The second characteristic of light sensed with the second sensor at (406) is different from the first characteristic of light sensed with the first sensor at (404). For example, in certain exemplary aspects, the second characteristic of light may be an intensity of light at a second wavelength. The second wavelength may be indicative of the confined laser beam hitting a second layer of the near wall of the airfoil. For example sensing light at the second wavelength may be indicative of the confined laser beam hitting a metal portion of the near wall of airfoil.

The method further includes at (408) determining a hole progress based on the first characteristic of light sensed at (404) and the second characteristic of light sensed at (406). In certain exemplary aspects, determining the hole progress at (408) based on the first characteristic of light sensed at (404) and the second characteristic of light sensed at (406) may include comparing the intensity of light sensed at the first wavelength to an intensity of light sensed at the second wavelength. For example, a ratio of the intensity of light sensed at the first wavelength to the intensity of light sensed at the second wavelength may be indicative of a progress of the hole through the first layer of the near wall of the airfoil.

In certain exemplary aspects, determining the hole progress at (408) based on the first characteristic of light sensed at (404) and the second characteristic of light sensed at (406) may further include determining the hole is at least a predetermined amount through the first layer of the near wall of the airfoil. For example, the exemplary method may include determining the hole is at least about ninety percent through the first layer of the near wall the airfoil, such as at least about ninety-five percent through the first layer of the near wall of the airfoil, such as at least about ninety-eight percent through the first layer of the near wall of the airfoil.

Additionally, depending on certain factors, such as the type of material the thermal barrier coating is made of, it may be desirable to drill through the thermal barrier coating of the near wall of the airfoil at a lower power than through the underlying metal portion of the airfoil. Accordingly, in response to determining the hole progress at (408), for example, in response to determining the hole is at least a predetermined amount through the first layer of the near wall the airfoil, the method (400) may further include at (410) adjusting one or more operating parameters of the confined laser drill. For example, the method (400) may include increasing a power, increasing a pulse rate, and/or increasing a pulse width of the confined laser drill.

Is be appreciated, however, that in other exemplary aspects, the first characteristic of light and second characteristic of light may each be any other suitable characteristic of light. For example, in other exemplary aspects, the first sensor may be a suitable optical sensor and the first characteristic of light may be an intensity of light. Such an exemplary aspect may further include determining one or both of a reflected pulse width of the confined laser drill and a reflected pulse frequency of the confined laser drill. Similar to as discussed in greater detail above with reference to FIGS. 3 through 5, based on one or both of the determined reflected pulse width of the confined laser drill and the determined pulse frequency of the confined laser drill, the exemplary method (400) of FIG. 18 may further include determining a depth of the hole being drilled by the confined laser drill. Moreover, in such an exemplary aspect, the second sensor may also be an optical sensor and the second characteristic of light may be a wavelength of the light. As stated, the wavelength of the light may be indicative of the material into which the confined laser beam is being directed. Accordingly, the exemplary method (400) of FIG. 18 may further include determining a material into which the confined laser beam is being directed based on the sensed wavelength of light by the second sensor.

In such an exemplary aspect, in response to determining the depth of the hole and determining the material into which the confined laser beam is being directed, the exemplary method (400) of FIG. 18 may further include adjusting one or more operating parameters of the confined laser drill. More particularly, the exemplary method (400) of FIG. 18 may further include determining the hole has been drilled through the first layer of the near wall the airfoil and increasing a power, increasing a pulse rate, and/or increasing a pulse width of the confined laser drill to assist with drilling through the metal portion of the near wall the airfoil. Alternatively, the exemplary method (400) of FIG. 18 may further include determining the hole is at least a predetermined amount through the metal part of the near wall of the airfoil and may decrease a power, decrease a pulse rate, and/or decrease a pulse width of the confined laser drill to prevent unnecessary damage to, e.g., a far wall of the airfoil.

In any of the above exemplary aspects, it should be appreciated that determining the hole progress at (408) based on the first characteristic of light sensed at (404) and the second characteristic of light sensed at (406) may include using any suitable control methodology. For example, determining the hole progress at (408) may include utilizing lookup tables taking into account certain factors. These lookup tables may be determined experimentally. Additionally, or alternatively, determining the hole progress at (408) may include utilizing a fuzzy logic control methodology to analyze the sensed first and second characteristics of light sensed at (404) and (406), respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A method for drilling a hole in a near wall of a component, the method comprising:
   directing a confined laser beam of a confined laser drill towards a metal portion of the near wall of the component to drill the hole in the metal portion of the near wall of the component, the confined laser beam defining a beam axis and the near wall positioned adjacent to a cavity defined in the component;
   sensing a characteristic of light directed along the beam axis away from the component with a sensor, the characteristic of light being a characteristic of light reflected as a result of the directing of the confined laser beam towards the near wall; and
   determining one or more operational conditions based on the characteristic of light sensed with the sensor, the one or more operational conditions including a depth of the hole being drilled by the confined laser drill through the metal portion of the near wall of the component prior to the confined laser drill breaking through the metal portion of the near wall of the component, the depth being greater than zero and less than a depth of the near wall of the component.

2. The method of claim 1, wherein the component is an airfoil of a turbine.

3. The method of claim 1, wherein the sensor is offset from the beam axis, and wherein sensing a characteristic of light directed along the beam axis away from the component with the sensor comprises redirecting at least a portion of the light directed along the beam axis away from the component to the sensor with a lens.

4. The method of claim 3, wherein the lens is positioned in the beam axis at approximately a forty-five degree angle with the beam axis, and wherein the lens includes a coating on a first side for redirecting at least a portion of the light traveling along the beam axis away from the component to the sensor.

5. The method of claim 1, wherein sensing a characteristic of light directed along the beam axis away from the component with the sensor comprises sensing an intensity of light directed along the beam axis away from the component with the sensor, and wherein determining one or more operational conditions based on the characteristic of light sensed with the sensor comprises determining one or both of a reflected pulse rate of the confined laser drill and a reflected pulse width of the confined laser drill.

6. The method of claim 5, wherein determining one or more operational conditions based on the characteristic of light sensed with the sensor further comprises determining the depth of the hole being drilled based on one or both of the reflected pulse rate and the reflected pulse width.

7. The method of claim 6, wherein determining the depth of the hole being drilled based on one or both of the reflected pulse rate and the reflected pulse width comprises comparing one or both of the reflected pulse rate and the reflected pulse width determined to an actual pulse rate of the confined laser drill, an actual pulse width of the confined laser drill, or both.

8. The method of claim 1, wherein sensing the characteristic of light directed along the beam axis away from the component with the sensor comprises sensing one or more wavelengths of the light directed along the beam axis away from the component with the sensor, and wherein determining one or more operational conditions based on the characteristic of light sensed with the sensor comprises comparing the sensed one or more wavelengths of the light to predetermined values and determining the depth of the hole being drilled based on the comparing of the sensed one or more wavelengths of the light to predetermined values.

9. The method of claim 1, further comprising
   changing an operational parameter of the confined laser drill in response to determining one or more operational conditions.

10. The method of claim 1, further comprising
    determining an indicated breakthrough of the confined laser beam of the confined laser drill through the near wall of the component based on the characteristic of light sensed along the beam axis with the sensor.

11. The method of claim 1, further comprising
    determining a breakthrough of the confined laser beam of the confined laser drill through the near wall of the component based on the determined one or more operational conditions; and
    continuing to direct the confined laser beam of the confined laser drill towards the near wall of the component subsequent to determining a breakthrough of the confined laser beam of the confined laser drill through the near wall of the component.

12. The method of claim 11, further comprising continuing to sense the characteristic of light directed along the beam axis away from an airfoil with the sensor subsequent to determining the breakthrough of the confined laser beam of the confined laser drill through the near wall of the component; and determining a completion of the hole in the near wall of the component based on the characteristic of light sensed along the beam axis with the sensor.

13. The method of claim 1, wherein sensing a characteristic of light directed along the beam axis away from the component with a sensor comprises sensing an intensity of light directed along the beam axis away from the component with a sensor, and wherein determining one or more operational conditions based on the characteristic of light sensed with the sensor comprises determining a noise level in the intensity of light directed along the beam axis away from the component.

14. The method of claim 13, wherein determining one or more operational conditions based on the characteristic of light sensed with the sensor further comprises determining a depth of the hole being drilled based on the determined noise level in the intensity of light directed along the beam axis away from the component.

15. The method of claim 1, wherein the confined laser beam comprises a laser beam inside a fluid column.

16. A system for drilling a hole in a near wall of a component, the system comprising:
- a confined laser drill utilizing a confined laser beam defining a beam axis, the confined laser drill configured to drill the hole through a metal portion of the near wall of the component, the near wall positioned adjacent to a cavity defined by the component;
- a sensor positioned to sense a characteristic of light directed along the beam axis away from the near wall of the component, the characteristic of light being a characteristic of light reflected as a result of the directing of the confined laser beam towards the near wall; and
- a controller operably connected to the sensor, the controller configured to determine one or more operational conditions based on the characteristic of light sensed with the sensor, the one or more operational conditions including a depth of the hole being drilled through the metal portion of the near wall of the component by the confined laser drill prior to the confined laser drill breaking through the metal portion of the near wall of the component, the depth being greater than zero and less than a depth of the near wall of the component.

17. The system of claim 16, wherein the sensor is configured to sense an intensity of the light directed along the beam axis away from the near wall of the component.

18. The system of claim 17, wherein the controller is further configured to determine one or both of a reflected pulse rate of the confined laser drill and a reflected pulse width of the confined laser drill.

* * * * *